United States Patent [19]

Watanabe et al.

[11] Patent Number: 4,745,510

[45] Date of Patent: May 17, 1988

[54] PERPENDICULAR MAGNETIC RECORDING AND REPRODUCING SYSTEM

[75] Inventors: Noboru Watanabe; Yasuo Ishizaka; Kazuo Kimura, all of Yokohama; Eiichiro Imaoka, Sagamihara, all of Japan

[73] Assignee: Victor Company of Japan, Ltd., Japan

[21] Appl. No.: 835,045

[22] Filed: Feb. 28, 1986

[30] Foreign Application Priority Data

Mar. 7, 1985 [JP] Japan ................................. 60-45327

[51] Int. Cl.⁴ .............................................. G11B 5/74
[52] U.S. Cl. .................................... 360/131; 360/125; 360/134; 360/135; 360/136; 428/694; 428/928
[58] Field of Search ............... 360/113, 122, 123, 125, 360/126, 127, 131, 134, 135, 136; 428/694, 928

[56] References Cited

U.S. PATENT DOCUMENTS

| | | | |
|---|---|---|---|
| 4,075,384 | 2/1978 | Suzuki et al. | 360/131 |
| 4,210,946 | 7/1980 | Iwasaki et al. | 360/131 |
| 4,237,506 | 12/1980 | Manly | 360/135 |
| 4,246,316 | 1/1981 | Aonuma et al. | 360/131 |
| 4,423,453 | 12/1983 | Kawahara et al. | 360/131 |
| 4,624,883 | 11/1986 | Yamaguchi et al. | 360/136 |
| 4,631,612 | 12/1986 | Shiiki et al. | 360/122 |
| 4,636,448 | 1/1987 | Morita et al. | 360/134 |
| 4,688,130 | 8/1987 | Nakanouchi et al. | 360/134 |

FOREIGN PATENT DOCUMENTS

| | | | |
|---|---|---|---|
| 77069 | 4/1983 | European Pat. Off. | 360/131 |
| 0091812 | 10/1983 | European Pat. Off. | |
| 53-54002 | 5/1978 | Japan | 360/131 |
| 59-87612 | 5/1984 | Japan | 360/131 |
| 60-211618 | 10/1985 | Japan | 360/131 |

OTHER PUBLICATIONS

Japanese Laid-Open Patent Application No. 59-87612 (Application No. 57-198159).
IEEE Transactions on Magnetics, vol. MAG-20, No. 5, Sep. 1984, pp. 774, 775.

Primary Examiner—John H. Wolff
Assistant Examiner—Matthew J. Bussan
Attorney, Agent, or Firm—Andrus, Sceales, Starke & Sawall

[57] ABSTRACT

A perpendicular magnetic recording and reproducing system records and reproduces a signal on and from a perpendicular magnetic recording medium comprising a magnetic layer which is made from one magnetic material and is constituted by a layer having a low coercivity and a layer having a high coercivity on top of the layer having the low coercivity, by use of a ring core head and utilizes the layer having the low coercivity as a high permeability layer and the layer having the high coercivity as a perpendicular magnetization layer.

4 Claims, 19 Drawing Sheets $\delta = 0.50 \mu m$ $\delta = 0.20 \mu m$ $\delta = 0.05 \mu m$

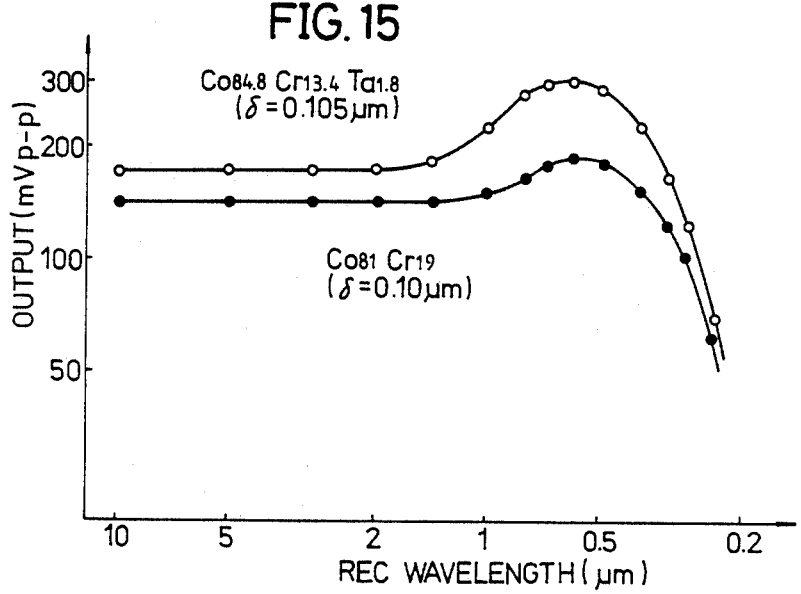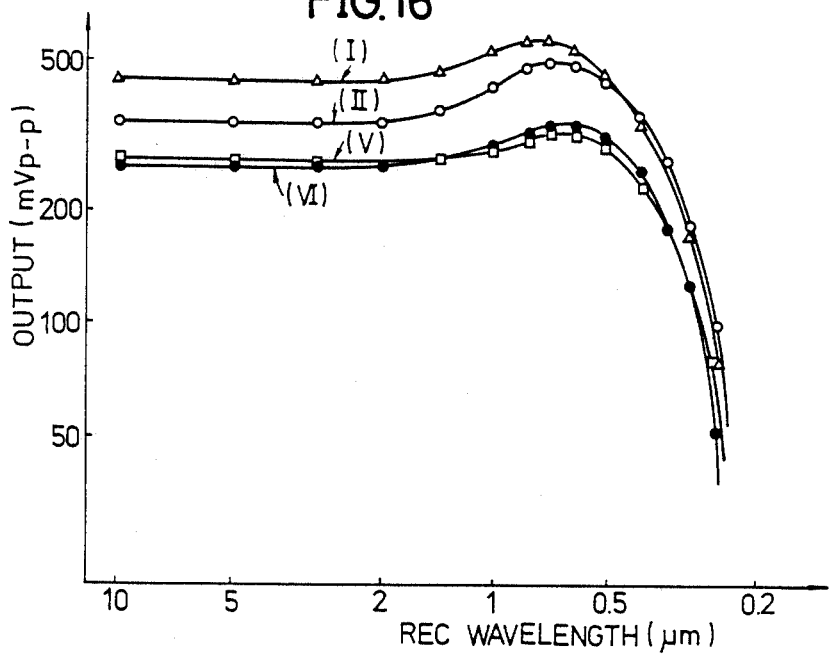

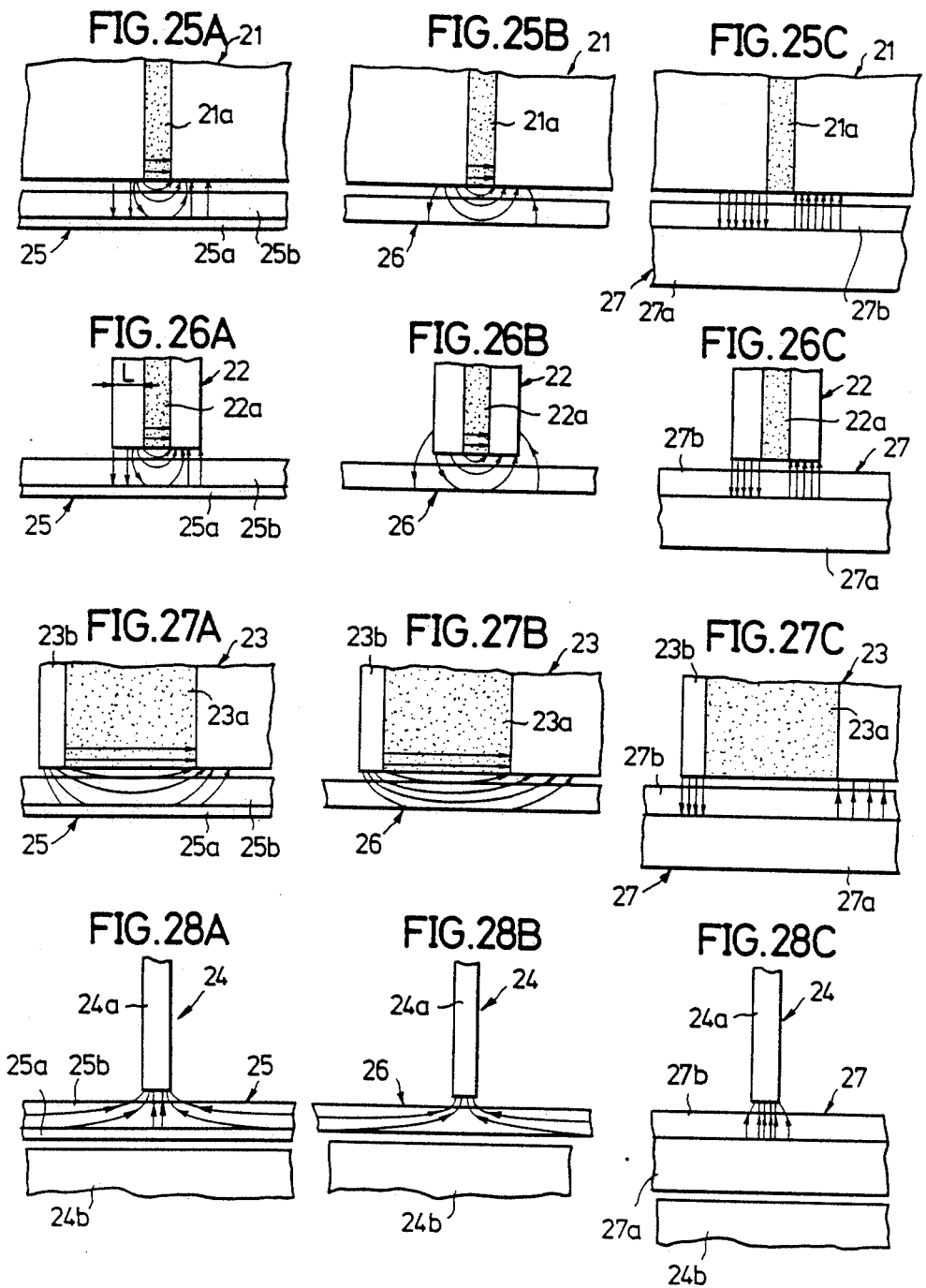

PERPENDICULAR MAGNETIC RECORDING AND REPRODUCING SYSTEM

BACKGROUND OF THE INVENTION

The present invention generally relates to perpendicular magnetic recording and reproducing systems, and more particularly to a perpendicular magnetic recording and reproducing system which realizes satisfactory perpendicular magnetic recording and reproducing characteristics.

Generally, when recording and reproducing a signal on and from a magnetic recording medium by use of a ring core head as a magnetic head, the ring core head magnetizes a magnetic layer of the magnetic recording medium in a longitudinal direction of the magnetic recording medium (that is, in an in-plane direction) at the time of the recording and picks up the recording at the time of the reproduction. However, according to such a longitudinal magnetic recording system, it is known that the demagnetization field becomes high as the recording density increases and the demagnetization field introduces undesirable effects to the high density magnetic recording. Hence, in order to eliminate the undesirable effects of the demagnetization, a perpendicular magnetic recording system has been proposed in which the ring core head magnetizes the magnetic layer of the magnetic recording medium in a direction perpendicular to the magnetic layer. According to the perpendicular magnetic recording system, the demagnetization field becomes low as the magnetic recording density increases, and theoretically, it is possible to realize a satisfactory high density magnetic recording in which there is no decrease in the remanent magnetization.

As a conventional perpendicular magnetic recording medium which is used in the perpendicular magnetic recording system, there is a perpendicular magnetic recording medium having a cobalt-chromium (Co—Cr) film formed on a base film by a sputtering process. As is well known, the Co—Cr film is extremely suited for use in the perpendicular magnetic recording medium because the Co—Cr film has a relatively high saturation magnetization (Ms) and favors magnetization in a direction perpendicular to the Co—Cr film (that is, the coercivity in the direction perpendicular to the Co—Cr film is large and the axis of easy magnetization is perpendicular to the Co—Cr film).

However, when the ring core head performs the perpendicular magnetic recording and reproduction with respect to the perpendicular magnetic recording medium having the sputtered Co—Cr film, it is impossible to concentrate the magnetic flux at a predetermined magnetic recording position on the perpendicular magnetic recording medium, and there is a disadvantage in that it is impossible to obtain a strong magnetization which is in the direction perpendicular to the Co—Cr film and does not spread in the longitudinal direction of the perpendicular magnetic recording medium. In other words, when the ring core head is used to perform the recording on the Co—Cr film of the perpendicular magnetic recording medium, the magnetization direction easily deviates in the longitudinal direction of the perpendicular magnetic recording medium since the magnetic field generated by the ring core head includes considerable components in the in-plane direction. Accordingly, in order to maintain the magnetization direction in the perpendicular direction, the perpendicular magnetic recording medium must have a high perpendicular anisotropic magnetic field and have a saturation magnetization which is suppressed to a certain extent. However, the Co—Cr film does not have such characteristics, and there is a disadvantage in that it is impossible to perform a satisfactory perpendicular magnetic recording by the ring core head. In addition, the coercivity in the perpendicular direction must be large in order to obtain a high reproduced output from the perpendicular magnetic recording medium having the Co—Cr film. On the other hand, it is desirable to make the thickness of the perpendicular magnetic recording medium large in order to decrease the demagnetization field, but the perpendicular magnetic recording medium will not make contact with the ring core head in a satisfactory state when the thickness of the perpendicular magnetic recording medium is large because the perpendicular magnetic recording medium will lose its flexibility and become rigid. In this case, there are disadvantages in that the rigid perpendicular magnetic recording medium is easily damaged and undesirable effects are introduced to the ring core head, and it is impossible to perform a satisfactory perpendicular magnetic recording and reproduction.

Accordingly, a perpendicular magnetic recording medium having a double film construction has been proposed. According to this perpendicular magnetic recording medium, a film having a high permeability, that is, a film having a low coercivity such as a nickel-ion (Ni—Fe) film, is formed between the Co—Cr film and the base film. The magnetic flux which is spread within the high permeability film is concentrated toward the magnetic pole of the ring core head at a predetermined magnetic recording position in order to obtain a strong magnetization which is in the perpendicular direction and does not spread in the longitudinal direction of the perpendicular magnetic recording medium. However, in the case of the perpendicular magnetic recording medium having the double film construction, the coercivity of the high permeability film is extremely small compared to the coercivity of the Co—Cr film, and there is a disadvantage in that Barkhausen noise is generated. For example, the coercivity of the Co—Cr film is over 700 Oe, and the coercivity of the high permeability film is under 10 Oe. Further, in order to produce the perpendicular magnetic recording medium having the double film construction, an amorphous (ion-nickel) Fe—Ni alloy or the like is formed on the base film by a sputtering process under a predetermined sputtering condition suited for forming the high permeability film, and Co—Cr is thereafter formed on the high permeability film by a sputtering process under a certain sputtering condition suited for forming the Co—Cr film. As a result, the sputtering condition under which the sputtering process is performed and the target must be changed for the formation of each film, and the sputtering processes cannot be performed continuously. Therefore, there are disadvantages in that the processes of manufacturing the perpendicular magnetic recording medium are complex and unsuited for mass production.

On the other hand, as the magnetic which is used in the perpendicular magnetic recording and reproducing system, there are in addition to the ring core head an auxiliary pole type (or driven) perpendicular magnetic head (hereinafter simply referred to as an auxiliary pole type head) having an auxiliary magnetic pole opposing a main magnetic pole and a single-sided main pole type (or driven) perpendicular magnetic head (hereinafter simply referred to as a single-sided main pole type head) not requiring an auxiliary magnetic pole and having a main magnetic pole opposing only one surface of the perpendicular magnetic recording medium. However, in the case of the perpendicular magnetic recording and reproducing system using the auxiliary pole type head, the perpendicular magnetic recording medium must be inserted between the main and auxiliary magnetic poles of the auxiliary pole type head, and the application of the system is limited. In other words, there is a disadvantage in that it is difficult to employ the auxiliary pole type head in a recording and reproducing apparatus such as a video tape recorder and a hard disc player. On the other hand, in the case of the single-sided main pole type head, the disadvantage of the auxiliary pole type head is eliminated, however, the construction of the single-sided main pole type head becomes complex. Furthermore, the single-sided main pole type head is disadvantageous in that the magnetic field distribution cannot be directed in the perpendicular direction as much as the auxiliary pole type head.

SUMMARY OF THE INVENTION

Accordingly, it is a general object of the present invention to provide a novel and useful perpendicular magnetic recording and reproducing system in which the disadvantages described heretofore are eliminated, by noting the fact that when a magnetic material is coated on a base of a magnetic recording medium to form a magnetic layer the formed magnetic layer is constituted by two layers having different coercivities, and by using the two layers for the perpendicular magnetization by employing a ring core head as the magnetic head.

Another and more specific object of the present invention is to provide a perpendicular magnetic recording and reproducing system which records and reproduces a signal on and from a perpendicular magnetic recording medium comprising a magnetic layer which is made from one magnetic material and is constituted by a layer having a low coercivity and a layer having a high coercivity on top of the layer having the low coercivity, by use of a ring core head and utilizing the layer having the low coercivity as a high permeability layer and the layer having the high coercivity as a perpendicular magnetization layer. According to the perpendicular magnetic recording and reproducing system of the present invention, it is possible to perform the perpendicular magnetic recording and reproduction with a characteristic which is especially satisfactory when the recording wavelength is short and obtain a high reproduced output by use of the ring core head. In addition, since the ring core head is used as the magnetic head, it is unnecessary to make design modifications in the recording and reproducing apparatuses to which the perpendicular magnetic recording and reproducing system of the present invention is applied, and the perpendicular magnetic recording and reproducing system of the present invention can be applied to various magnetic recording and reproducing apparatuses. Further, because the magnetic layer of the perpendicular magnetic recording medium used in the perpendicular magnetic recording and reproducing system of the present invention is made from one magnetic material and is constituted by the two layers having different magnetic characteristics, an in-plane magnetization (M-H) hysteresis loop of the magnetic layer as a whole rises sharply and anomalously in a vicinity of an origin and the so-called magnetization jump occurs. Thus, the perpendicular magnetic recording and reproducing characteristics can be improved by using as the magnetic layer of the perpendicular magnetic recording medium the layer in which the magnetization jump occurs. In the present specification, a sudden change or steep inclination in the in-plane M-H hysteresis loop will be referred to as the magnetization jump, and a magnitude of the magnetization jump will be referred to as a magnetization jump quantity.

Other objects and further features of the present invention will be apparent from the following detailed description when read in conjunction with the accompanying drawings.

BRIEF DESCRIPTION OF THE DRAWINGS

FIG. 15 is a graph showing the relationship between the recording wavelength and the reproduced output when the perpendicular magnetic recording and reproduction are performed with respect to the Co—Cr—Nb thin film and the Co—Cr thin film;

FIGS. 16 and 17 are graphs respectively showing the relationship between the recording wavelength and the reproduced output when the perpendicular magnetic recording and reproduction are performed with respect to the thin films shown in Table 3;

FIGS. 25A through 25C are diagrams for explaining the recording and reproducing characteristics for respective combinations of the ring core head and various recording mediums;

FIGS. 26A through 26C are diagrams for explaining the recording and reproducing characteristics for respective combinations of a thin film ring core head and various recording mediums;

FIGS. 27A through 27C are diagrams for explaining the recording and reproducing characteristics for respective combinations of a single-sided main pole type head and various recording mediums;

FIGS. 28A through 28C are diagrams for explaining the recording and reproducing characteristics for respective combinations of an auxiliary pole type head and various recording mediums;

DETAILED DESCRIPTION

Figure 1:
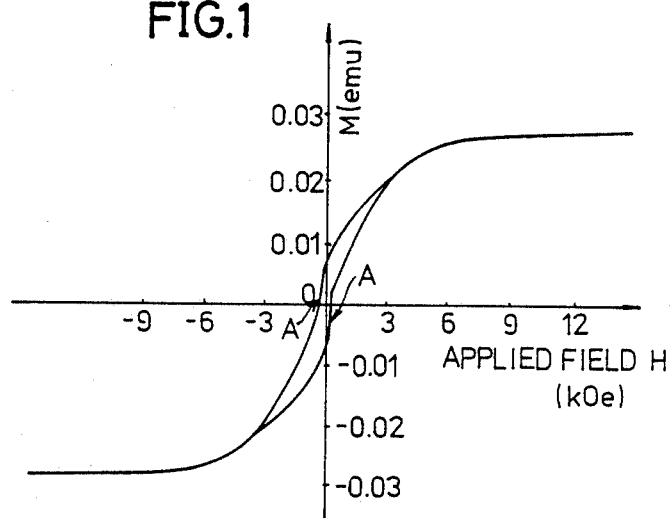
FIG. 1 shows an in-plane M-H hysteresis loop for the case where a magnetic layer of an embodiment of the perpendicular magnetic recording medium used in the perpendicular magnetic recording and reproducing system according to the present invention is constituted by a cobalt-chromium-niobium (Co—Cr—Nb) thin film having a thickness of 0.2 micron and a magnetic field of 15 kOe is applied thereto.

The perpendicular magnetic recording medium (hereinafter simply referred to as a recording medium) which is used in the perpendicular magnetic recording and reproducing system according to the present invention is made by sputtering on a substrate or a tape which becomes a base a magnetic material which is used as a target. For example, the substrate or tape is made of a polyimide resin or the like, and the magnetic material contains cobalt (Co), chromium (Cr) and at least one of niobium (Nb) and tantalum (Ta).

When a metal or the like such as an Co—Cr alloy is sputtered on the base, it is known that the sputtered film does not have the same crystal structure in a direction perpendicular to the film surface. It is known from various experiments and from scanning electron microscope (SEM) pictures that a first crystal layer of fine grain is formed in a vicinity of the base for an extremely small thickness, and a second crystal layer of coarse grain is formed on the first crystal layer. For example, the fact that the first crystal layer at the bottom portion of the sputtered film does not have a well defined columnar structure while the second crystal layer formed on the first crystal layer has a well defined columnar structure, is disclosed by Edward R. Wuori and Professor J. H. Judy, "Initial Layer effects in Co—Cr films", IEEE TRANSACTIONS ON MAGNETICS, Vol. MAG-20, No. 5, September 1984, pp. 774–775, and by William G. Haines, "VSM Profiling of CoCr Films: A New Analytical Technique", IEEE TRANSACTIONS ON MAGNETICS, Vol. MAG-20, No. 5, September 1984, pp. 812–814.

The present inventors noted on the above points, and sputtered on various metals which have a Co—Cr alloy as the base and are respectively added with a third element. Then, physical characteristics of the first crystal layer of fine grain formed on the bottom portion of the sputtered metal film and the second crystal layer of coarse grain formed on the first crystal layer were measured for each of the various sputtered metal films. As a result, it was found that when Nb or Ta is added to the metal as the third element, the perpendicular coercivity of the first crystal layer is extremely small compared to the perpendicular coercivity of the second crystal layer. The system of the present invention is characterized in that this first crystal layer having the small perpendicular coercivity is used as a high permeability layer and the second crystal layer having the large perpendicular coercivity is used as a perpendicular magnetization layer of the recording medium which is used, and a ring core head is used as the magnetic head.

Description will now be given with respect to the experimental results which were obtained by measuring the coercivities of the first and second crystal layers formed on the base by the sputtering. A Co—Cr—Nb thin film or a Co—Cr—Ta thin film is formed on the base by a sputtering process performed under the following conditions.

(1) Sputtering apparatus:
RF magnetron sputtering apparatus.
(2) Sputtering method:
Continuous sputtering, at an initial discharge pressure of $1 \times 10^{-6}$ Torr and introducing argon (Ar) gas until the pressure reaches $1 \times 10^{-3}$ Torr.
(3) Base:
A polyimide resin having a thickness of 20 microns.
(4) Target:
A composite target obtained by placing small pieces of Nb or Ta on the Co—Cr alloy.
(5) Distance between target and base:
110 mm. The magnetic characteristic of the thin films was measured by a vibrating sample magnetometer manufactured by Riken Denshi of Japan, the composition of the thin films was measured by an energy dispersion type microanalyzer manufactured by KEVEX of the United States and the crystal orientation of the thin films was measured by an X-ray analyzer manufactured by Rigaku Denki of Japan.

FIG. 1 shows an in-plane M-H hysteresis loop for the case where a magnetic field of 15 kOe is applied to a recording medium which is obtained by adding Nb to Co—Cr as the third element (the same phenomenon occurs when the Nb is added in a range of 2 to 10 at%) and sputtering the Co—Cr—Nb on the polyimide resin base with a film thickness of 0.2 micron. As shown in FIG. 1, the in-plane M-H hysteresis loop rises sharply and anomalously in a vicinity of an origin as indicated by an arrow A and the so-called magnetization jump (hereinafter simply referred to as a jump) occurs. When it is assumed that a uniform crystal growth constantly occurs when the Co—Cr—Nb is sputtered on the base to form the Co—Cr—Nb thin film, the jump shown in FIG. 1 would not occur, and it can therefore be conjectured that a plurality of crystal layers having different magnetic characteristics coexist within the Co—Cr—Nb thin film.

Figure 2:
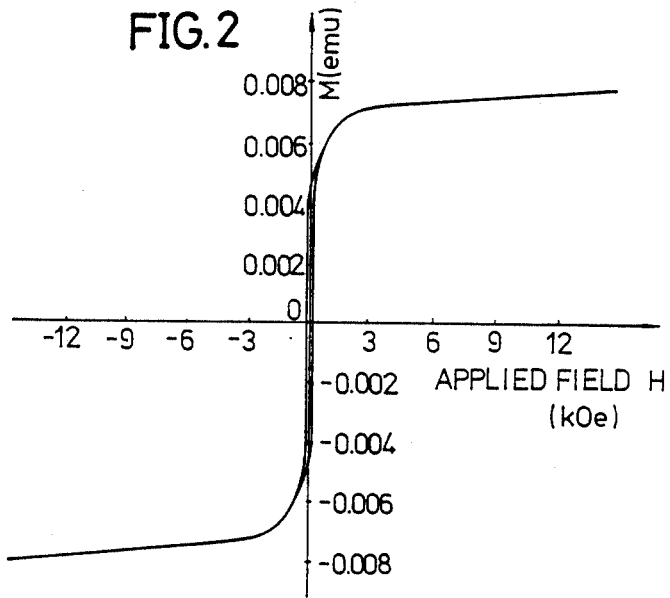
FIG. 2 shows an in-plane M-H hysteresis loop for the case where the magnetic layer of the embodiment of the perpendicular magnetic recording medium used in the perpendicular magnetic recording and reproducing system according to the present invention is constituted by a Co—Cr—Nb thin film having a thickness of 0.05 micron and a magnetic field of 15 kOe is applied thereto.

FIG. 2 shows an in-plane M-H hysteresis loop for the case where a magnetic field of 15 kOe is applied to a recording medium which is obtained by sputtering the Co—Cr—Nb on the polyimide resin base with a film thickness of 0.05 micron under the same sputtering condition. Unlike the case shown in FIG. 1, there is no jump in the in-plane M-H hysteresis loop shown in FIG. 2, and it can be seen that the Co—Cr—Nb thin film having a film thickness in the order of 0.05 micron is constituted by a substantially uniform crystal layer. In addition, it can be seen from FIG. 2 that an in-plane coercivity Hc($\parallel$) (hereinafter simply referred to as a coercivity Hc($\parallel$)) for the case where the film thickness is in the order of 0.05 micron is extremely small and the in-plane permeability is therefore extremely high. From these results, the coercivity Hc($\parallel$) of an initial layer which initially grows in the vicinity of the base by the sputtering is small, and this initial layer can be regarded as the first crystal layer of fine grain (hereinafter simply referred to as the first crystal layer) which has been confirmed by the SEM pictures as described before. A layer which grows on the initial layer has a coercivity Hc($\parallel$) which is larger than the coercivity Hc($\parallel$) of the initial layer, and this layer can be regarded as the second crystal layer of coarse grain (hereinafter simply referred to as the second crystal layer) which has also been confirmed by the SEM pictures.

Figure 3:
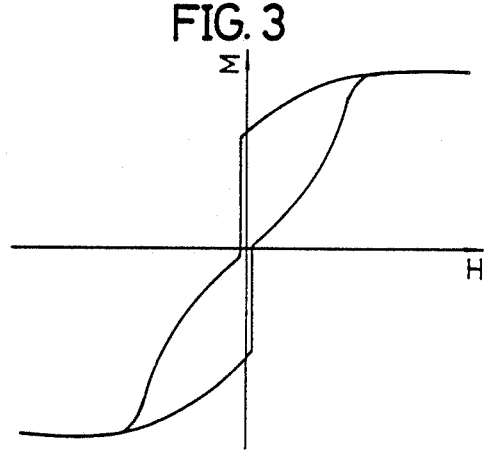
FIGS. 3 through 5 respectively show in-plane M-H hysteresis loops for explaining the reason why a magnetization jump occurs.
Figure 4:
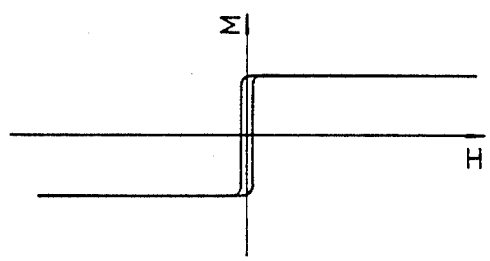
Figure 5:
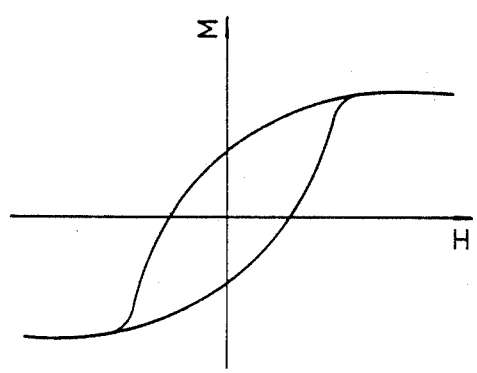

The reason why the jump occurs in the Co—Cr—Nb thin film in which the first and second crystal layer coexist will now be described in conjunction with FIGS. 3 through 5. It should be noted that the jump does not occur for all Co—Cr—Nb thin films with different compositions and sputtering conditions, as will be described later on in the specification. When the Co—Cr—Nb thin film is formed under a predetermined sputtering condition and the in-plane M-H hysteresis loop is obtained for this thin film by measurement, the obtained in-plane M-H hysteresis loop rises sharply in a vicinity of an origin as shown in FIG. 3 and the jump occurs. An in-plane M-H hysteresis loop shown in FIG. 4 for a thin film solely consisting of the first crystal layer can be obtained by measurement by forming a thin film which has a small film thickness. The second crystal layer can be regarded as having uniform crystal structure, and further, the in-plane M-H hysteresis loop shown in FIG. 3 can be regarded as a composition of the in-plane M-H hysteresis loop of the first crystal layer and an in-plane M-H hysteresis loop of the second crystal layer. Hence, the in-plane M-H hysteresis loop of the second crystal layer can be regarded as a smooth hysteresis loop shown in FIG. 5 in which the coercivity Hc($\parallel$) is larger than that of the first crystal layer and no jump occurs. In other words, the existence of the jump in FIG. 3 indicates that two layers having different magnetic characteristics coexist in the same thin film. For this reason, it can be understood that two layers having different magnetic characteristics also coexist in the Co—Cr—Nb thin film having the in-plane M-H hysteresis loop shown in FIG. 1. The coercivity of the second crystal layer can be obtained from a hysteresis loop which is obtained by subtracting the in-plane M-H hysteresis loop of the Co—Cr—Nb thin film which solely consists of the first crystal layer from the in-plane M-H hysteresis loop of the Co—Cr—Nb thin film in which the first and second crystal layers coexist. From the experimental results, it is proved that two layers having different magnetic characteristics coexist in the Co—Cr—Nb thin film when the in-plane M-H hysteresis loop of the Co—Cr—Nb thin film has a sharp rise in the vicinity of the origin and the jump occurs.

Figure 6:
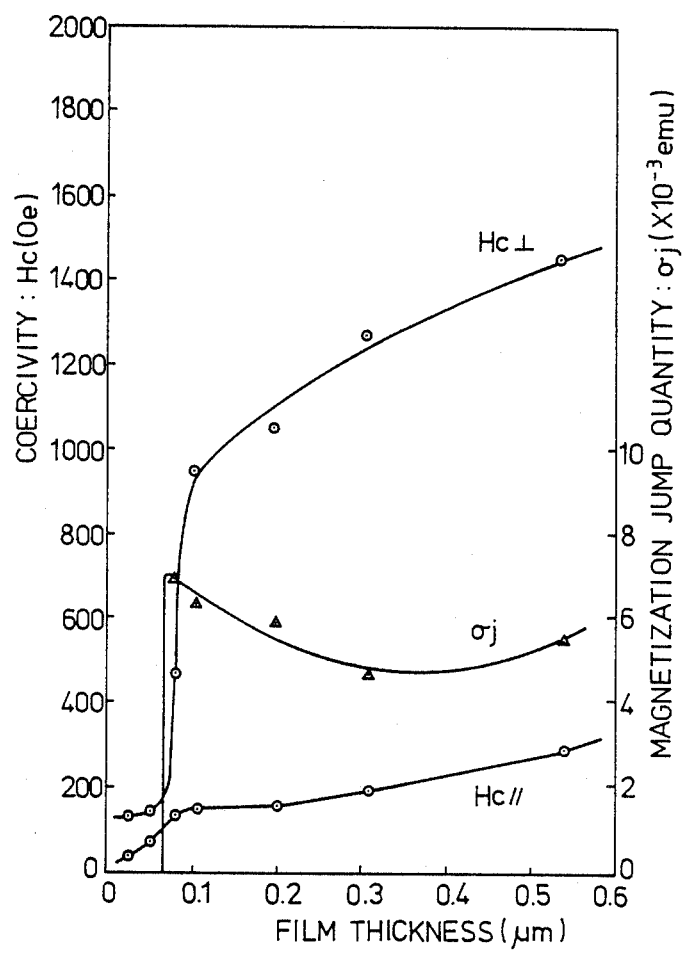
FIG. 6 is a graph showing an in-plane coercivity $Hc(\parallel)$, a perpendicular coercivity $Hc(\perp)$ and a magnetization jump quantity $\sigma_j$ for each film thickness when the film thickness of the Co—Cr—Nb thin film is controlled by varying the sputtering time.

Next, description will be given with respect to the magnetic characteristics of the two layers constituting the Co—Cr—Nb thin film which is sputtered on the base in relation to the film thickness of the CO—Cr—Nb thin film, by referring to FIG. 6. FIG. 6 is a graph showing the coercivity Hc($\parallel$), a perpendicular coercivity Hc($\perp$) (hereinafter simply referred to as a coercivity Hc($\perp$)) and a magnetization jump quantity (hereinafter simply referred to as a jump quantity) $\sigma_j$ for each film thickness when the film thickness of the Co—Cr—Nb thin film is controlled by varying the sputtering time.

Giving attention to the coercivity Hc($\parallel$), the coercivity Hc($\parallel$) is under 180 Oe and is extremely small when the film thickness is under 0.15 micron, and the in-plane permeability can be regarded as being high. In addition, the coercivity Hc($\parallel$) does not change greatly even when the film thickness increases. On the other hand, giving attention to the jump quantity $\sigma_j$, the jump quantity $\sigma_j$ rises sharply at the film thickness of approximately 0.075 micron and describes an upwardly-opening parabola for the thickness of over 0.075 micron. Further, giving attention to the coercivity Hc($\perp$), the coercivity Hc($\perp$) rises sharply from approximately 180 Oe at the film thickness of 0.05 to 0.15 micron and is over 900 Oe for the film thickness of over 0.15 micron. From these results, it can be seen that a boundary between the first and second crystal layers exists at the film thickness of approximately 0.05 to 0.15 micron. In other words, the coercivities Hc($\parallel$) and Hc($\perp$) of the first crystal layer at the film thickness of under 0.05 micron are both under 180 Oe and small, while the coercivity Hc($\parallel$) of the second crystal layer at the film thickness of over 0.15 micron is under approximately 180 Oe and small and the coercivity Hc($\perp$) of this second crystal layer is over 900 Oe and large. The second crystal layer is thus a high coercivity layer suited for the perpendicular magnetic recording and reproduction. At such a film thickness that the jump does not occur, the coercivities Hc($\parallel$) and Hc($\perp$) are both under 180 Oe and small. But at such a large film thickness that the jump occurs, the coercivity Hc($\perp$) sharply increases. It is hence also seen from this point of view that the Co—Cr—Nb thin film is constituted by two layers having different magnetic characteristics when the jump occurs. According to the experiments performed by the present inventors, when the composition and/or the sputtering condition is slightly changed, there is a slight change in the film thickness at which the jump quantity $\sigma_j$ and the coercivity Hc($\perp$) respectively rise sharply, and the slight change in the film thickness occurs within the range of 0.05 to 0.15 micron. That is, it can be regarded that the jump occurs when the first crystal layer has a thickness in the range of 0.05 to 0.15 micron.

Figure 7:
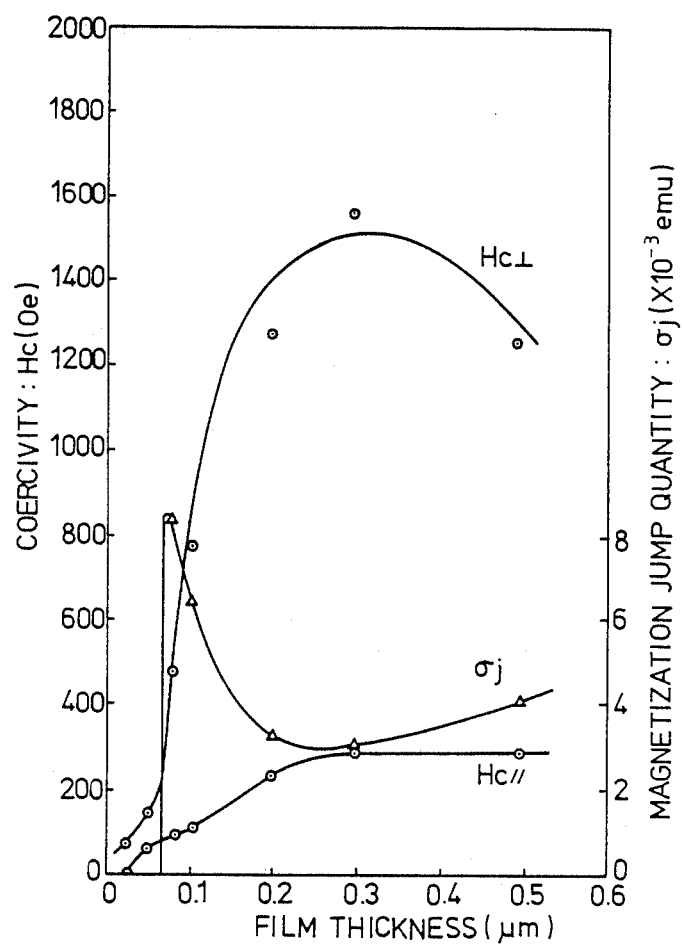
FIG. 7 is a graph showing an in-plane coercivity $Hc(\parallel)$, a perpendicular coercivity $Hc(\perp)$ and a magnetization jump quantity $\sigma_j$ for each film thickness when the film thickness of a cobalt-chromium-tantalum (Co—Cr—Ta) thin film is controlled by varying the sputtering time.

Next, the results shown in FIG. 7 are obtained when similar experiments are performed by adding Ta to Co—Cr as the third element (the same phenomenon occurs when the Ta is added in a range of 2 to 10 at%) and sputtering the Co—Cr—Ta on the polyimide resin base with various film thicknesses. FIG. 7 is a graph showing the coercivity Hc($\parallel$), the perpendicular coercivity Hc($\perp$) and the jump quantity $\sigma_j$ for each film thickness when the film thickness of the Co—Cr—Ta thin film is controlled by varying the sputtering time. The results obtained by adding the Ta to the Co—Cr are similar to the case where the Nb is added to the Co—Cr. As shown in FIG. 7, the boundary between the first and second crystal layers exists at the film thickness of 0.05 to 0.15 micron. At the film thickness of under 0.05 micron, that is, in the first crystal layer, the coercivities Hc($\parallel$) and Hc($\perp$) are both under 170 Oe and small, and a low coercivity layer exists at the film thickness of under 0.05 micron. On the other hand, at the film thickness of over 0.075 micron, that is, in the second crystal layer, the coercivity Hc($\parallel$) is small but the coercivity Hc($\perp$) rises from 200 Oe to over 750 Oe in the range of the film thickness in which the jump occurs and thereafter gradually increases as the film thickness increases. In other words, a high coercivity layer exists at the film thickness of over 0.075 micron.

Figure 8A:
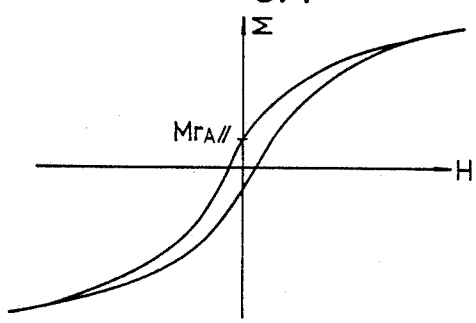
FIGS. 8A through 8C are graphs respectively showing an in-plane M-H hysteresis loop of the Co—Cr—Nb thin film in which no magnetization jump occurs.
Figure 8B:
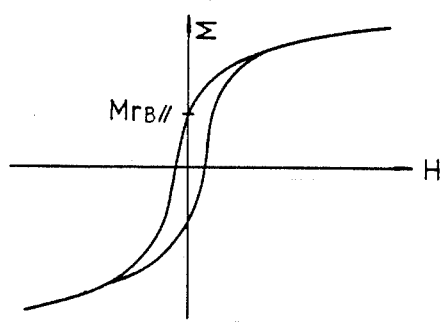
Figure 8C:
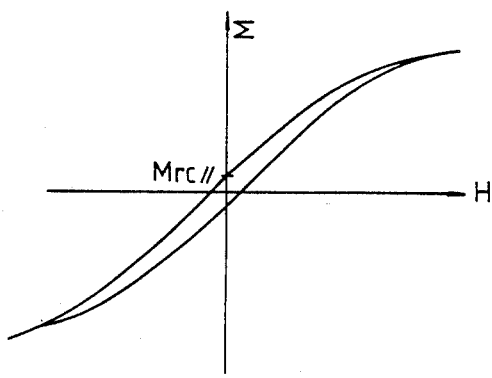

It should be noted from the experiments described above that the jump does not occur when the sputtering condition and the adding quantity of the Nb or Ta (2 to 10 at% in the case of the Nb and 1 to 10 at% in the case of the Ta) are changed from those described before, however, the first and second crystal layers are also formed within the Co—Cr—Nb thin film and the Co—Cr—Ta thin film in which no jump occurs (refer to the references cited on page 9). An example of the in-plane M-H hysteresis loop of the Co—Cr—Nb thin film in which no jump occurs will be described by referring to FIGS. 8A through 8C. FIG. 8A shows the in-plane M-H hysteresis loop for both the first and second crystal layers, FIG. 8B shows the in-plane M-H hysteresis loop solely for the first crystal layer and FIG. 8C shows the in-plane M-H hysteresis loop solely for the second crystal layer. It is seen from FIGS. 8A through 8C that the in-plane remanent magnetization $Mr_B(\parallel)$ of the first crystal layer is larger than the in-plane remanent magnetization $Mr_C$ of the second crystal layer. Further, the in-plane remanent magnetization $Mr_A(\parallel)$ of both the first and second crystal layers is unfavorable compared to the in-plane remanent magnetization $Mr_C(\parallel)$ of the second crystal layer, and the anisotropic magnetic field Mk is small. In addition, it is known that the orientation of the first crystal layer is poor (the $\Delta\theta 50$ is large) and the first crystal layer is unsuited for the perpendicular magnetic recording.

Figure 9:
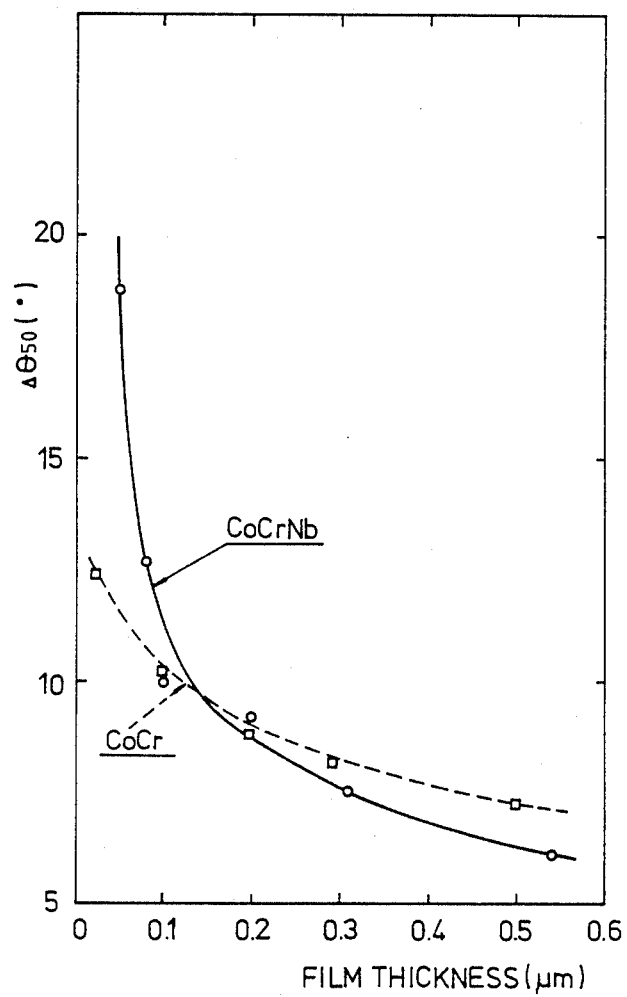
FIG. 9 is a graph showing the relationships of the rocking curve half-value ($\Delta\theta_{50}$) of the hcp (002) plane of each of a cobalt-chromium (Co—Cr) thin film and the Co—Cr—Nb thin film with respect to the film thickness.

FIG. 9 is a graph showing the relationships of the rocking curve half-value ($\Delta\theta_{50}$) of the hcp (002) plane of each of a cobalt-chromium (Co—Cr) thin film (composition of $Co_{81}Cr_{19}$ at%) and the Co—Cr—Nb thin film with respect to the film thickness. The Co—Cr thin film is formed under the same sputtering conditions as those described before except for the condition (4), and the Co—Cr alloy alone is used as the target in this case. It is seen from FIG. 9 that the orientation of the Co—Cr—Nb thin film is extremely poor in the initial stage of the film formation while the orientation of the Co—Cr thin film is satisfactory in the initial stage of the film formation. However, the orientation of the Co—Cr—Nb thin film improves rapidly as the film thickness of the thin film increases. The orientation of the Co—Cr—Nb thin film is more satisfactory than that of the Co—Cr thin film when the film thickness of the Co—Cr—Nb thin film is over approximately 0.15 micron. In other words, the orientation of the Co—Cr—Nb thin film is poor in the initial stage of the film formation, that is, during the formation of the first crystal layer, but the orientation of the Co—Cr—Nb thin film rapidly improves when the film thickness becomes over approximately 0.15 micron, that is, when the second crystal layer is formed. Hence, it can be understood that in the case of the Co—Cr—Nb thin film, two layers having different magnetic characteristics are formed depending on the film thickness, and the orientation of the second crystal layer is more satisfactory than that of the Co—Cr thin film.

Figure 10A:
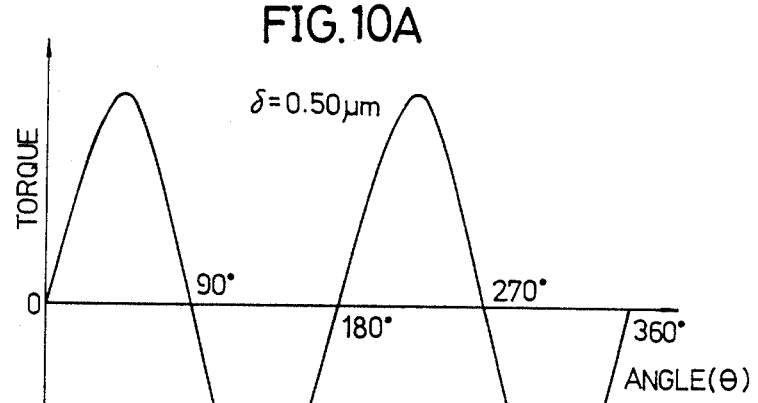
FIGS. 10A through 10C are graphs respectively showing torque curves of the Co—Cr thin films respectively having film thicknesses of 0.50, 0.20 and 0.05 micron.
Figure 10B:
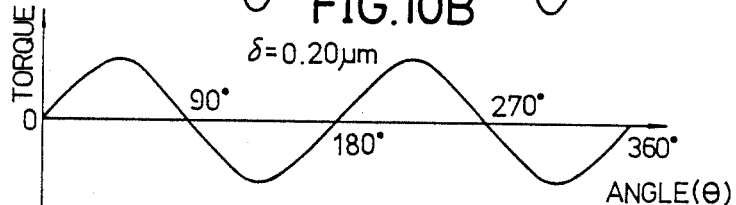
Figure 10C:
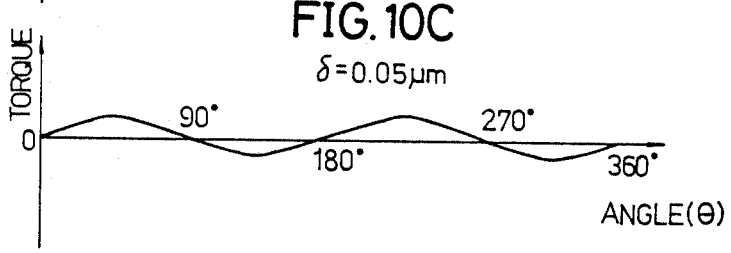
Figure 11A:
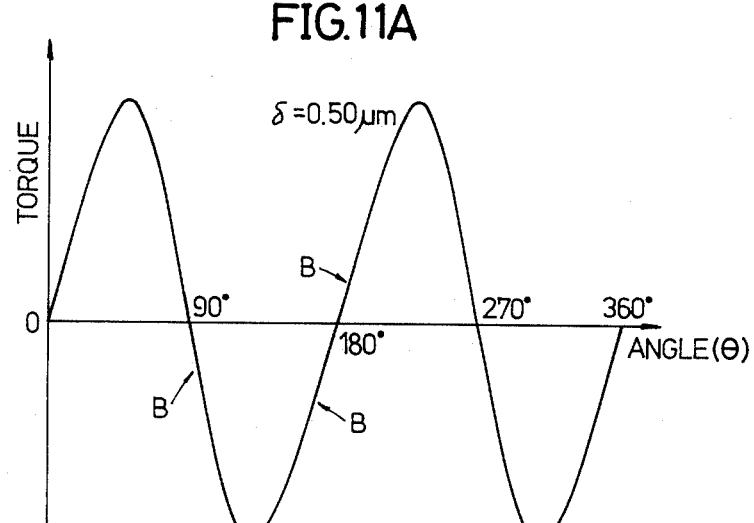
FIGS. 11A through 11C are graphs respectively showing torque curves of the Co—Cr—Nb thin films respectively having film thicknesses of 0.50, 0.18 and 0.05 micron.
Figure 11B:
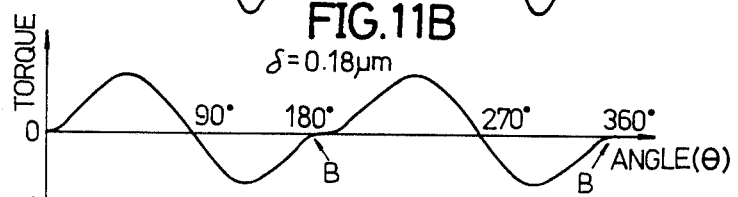
Figure 11C:
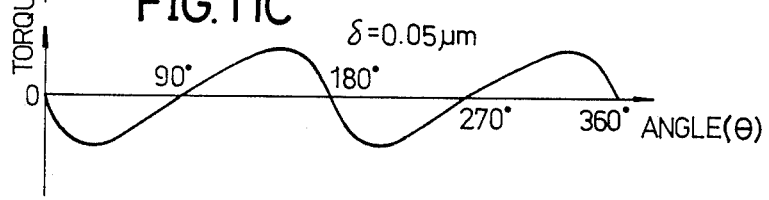

Next, the Co—Cr—Nb thin film will be examined from the point of view of the magnetic anisotropy. FIGS. 10A through 10C are graphs respectively showing torque curves of the Co—Cr thin films respectively having film thicknesses of 0.50, 0.20 and 0.05 micron, and FIGS. 11A through 11C are graphs respectively showing torque curves of the Co—Cr—Nb thin films respectively having film thicknesses of 0.50, 0.18 and 0.05 micron. In each of these graphs, the abscissa ($\theta$) represents the angle formed between the normal to the film surface and the applied magnetic field, the ordinate represents the torque, and the applied magnetic field to the thin film is 10 kOe. Moreover, the Co—Cr thin films and the Co—Cr—Nb thin films respectively have the composition of $Co_{18}Cr_{19}$ at% and $Co_{77.9}Cr_{16.0}Nb_{6.1}$ at% and the saturation magnetization Ms of 400 emu/cc and 350 emu/cc.

In the case of the Co—Cr thin films shown in FIGS. 10A through 10C, the polarity of the torque curve is the same for the three thin films and the axis of easy magnetization is perpendicular to the film surface. In the case of the Co—Cr—Nb thin films shown in FIGS. 11A and 11B respectively having the film thicknesses of 0.50 and 0.18 micron, the polarity of the torque curve is the same for the two thin films and the axis of easy magnetization is perpendicular to the film surface. However, in the case of the Co—Cr—Nb thin film shown in FIG. 11C having the film thickness of 0.05 micron, the polarity of the torque curve is opposite to that of the torque curves of the other thin films and the axis of easy magnetization is in-plane of the thin film. As described before, it can be regarded that only the first crystal layer is formed in the case of the Co—Cr—Nb thin film having the film thickness of 0.05 micron, and the axis of easy magnetization of the first crystal layer is in-plane of the first crystal layer. As the film thickness increases, the axis of easy magnetization becomes perpendicular to the film surface, and it can be regarded that the second crystal layer has a strong axis of easy magnetization which is perpendicular to the film surface. Further, it should be noted that in the torque curves of the Co—Cr—Nb thin films having the film thicknesses of over 0.05 micron, there are anomalous parts indicated by arrows B in FIGS. 11A and 11B. It can be regarded that the anomalous part in the torque curve is introduced due to the magnetic characteristic of the first crystal layer. In other words, when the film thickness of the thin film becomes larger than a predetermined value, the second crystal layer which has an axis of easy magnetization perpendicular to the film surface is formed on the first crystal layer which has an axis of easy magnetization in-plane of the first crystal layer. It can be conjectured that the first and second crystal layers having the different magnetic characteristics affect each other and the anomalous part is introduced in the torque curve of the thin film as a whole. It is hence also proved from the torque curves that two layers having different magnetic characteristics coexist in the single Co—Cr—Nb thin film.

When the Co—Cr—Nb or Co—Cr—Ta thin film constituted by the first and second crystal layers is used as the magnetic layer of the perpendicular magnetic recording medium and an attempt is made to magnetize the entire thin film in the direction perpendicular to the film surface according to the conventional concept, the existence of the first crystal layer is an extremely unfavorable primary factor to the perpendicular magnetization. The existence of the first crystal layer is an unfavorable primary factor for both cases where the jump does and does not occur. In other words, in the case where the jump occurs, the coercivities Hc($\parallel$) and Hc($\perp$) of the first crystal layer is extremely small and it can be regarded that there is virtually no perpendicular magnetization in the first crystal layer. On the other hand, in the case where the jump does not occur, the coercivity Hc($\parallel$) of the first crystal layer is larger than that of the case where the jump occurs, but the coercivity Hc($\perp$) of the first crystal layer is insufficient for realizing the perpendicular magnetic recording, and it can be regarded that it is impossible to perform a satisfactory perpendicular magnetic recording. Accordingly, even when the magnetization is performed in the direction perpendicular to the film surface, there is virtually no perpendicular magnetization in the first crystal layer, and the efficiency of the perpendicular magnetization of the thin film as a whole is deteriorated. Such a deterioration in the efficiency of the perpendicular magnetization is especially notable in the case of a magnetic head such as the ring core head which generates magnetic field including considerable components in the in-plane direction. In addition, giving attention to the film thickness, the thickness of the first crystal layer is under 0.15 micron and is approximately constant regardless of the film thickness of the thin film as a whole. Hence, when the film thickness of the thin film is reduced in order not to lose the flexibility of the recording medium, the relative thickness of the first crystal layer increases with respect to the film thickness of the thin film as a whole, and the perpendicular magnetization characteristic is further deteriorated.

However, the present invention found that the first crystal layer has such a magnetic characteristic that the coercivity Hc($\parallel$) is small and the permeability is relatively high, and magnetic characteristic of the first crystal layer is similar to that of the high permeability layer (for example, an Fe—Ni thin film) which is provided between the base and the Co—Cr thin film of the conventional recording medium. Hence, the first crystal layer having the small coercivity Hc($\parallel$) may be used as the high permeability layer and the second crystal layer having the large coercivity Hc($\perp$) may be used as the perpendicular magnetization layer, and the recording medium comprising the single thin film constituted by the first and second crystal layers can be regarded as having the same functions as the conventional perpendicular magnetic recording medium having the double film construction.

Description will now be given with respect to the change in the magnetic characteristic and the difference in the reproduced output when the composition and thickness of the Co—Cr—Nb thin film and the Co—Cr—Ta thin film are changed, by referring to Tables 1 through 3 and FIGS. 12A through 17. Table 1 shows various magnetic characteristics for the cases where the composition and the film thickness of the Co—Cr thin film and the Co—Cr—Nb thin film are varied. FIGS. 12A through 12E are graphs respectively showing the in-plane M-H hysteresis loops of the thin films shown in Table 1. In Table 1, $\delta$ represents the film thickness, Ms represents the saturation magnetization, Hc($\perp$) represents the perpendicular magnetization, Hc($\parallel$) represents the in-plane magnetization, Mr($\parallel$)/Ms represents the in-plane squareness ratio, Mr($\parallel$) represents the in-plane remanent magnetization of the thin film and Hk represents the perpendicular anisotropic magnetic field.

TABLE 1

| Composition (at %) | δ (μm) | Ms (emu/cc) | Hc(⊥) (Oe) | Hc(//) (Oe) | Δθ50 (deg) | Mr(//)/Ms | Hk (Oe) |
| --- | --- | --- | --- | --- | --- | --- | --- |
| $Co_{84.1}Cr_{13.2}Nb_{2.7}$ | 0.19 | 448 | 893 | 177 | 8.7 | 0.24 | 3030 |
| $Co_{85.3}Cr_{13.4}Nb_{1.3}$ | 0.19 | 497 | 677 | 435 | 8.9 | 0.21 | 3900 |
| $Co_{81}Cr_{19}$ | 0.20 | 449 | 728 | 446 | 10.1 | 0.19 | 4350 |
| $Co_{84.1}Cr_{13.2}Nb_{2.7}$ | 0.105 | 449 | 949 | 150 | 11.5 | 0.43 | 1320 |
| $Co_{81}Cr_{19}$ | 0.10 | 395 | 753 | 423 | 10.2 | 0.24 | 3420 |

Figure 12A:
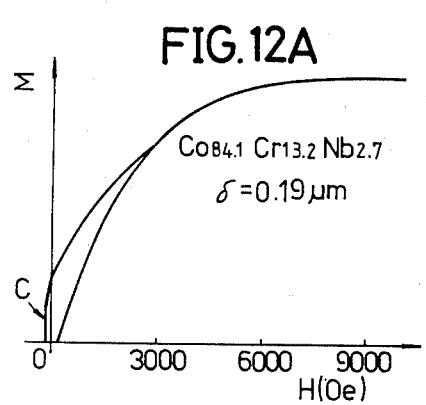
FIGS. 12A through 12E are graphs respectively showing in-plane M-H hysteresis loops of the thin films shown in Table 1.
Figure 12D:
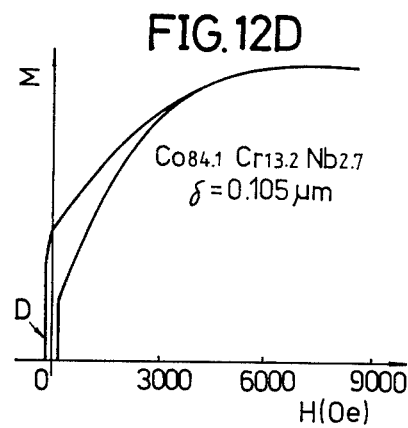
Figure 12B:
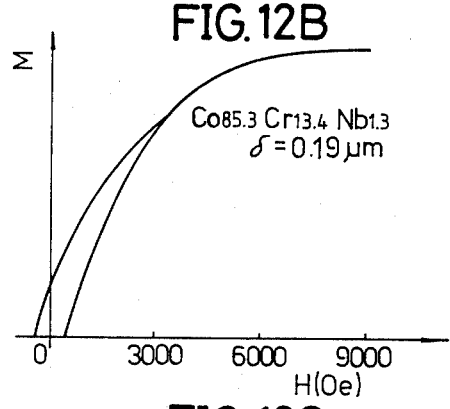
Figure 12E:
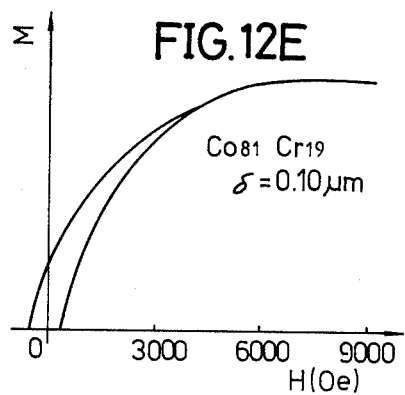
Figure 12C:
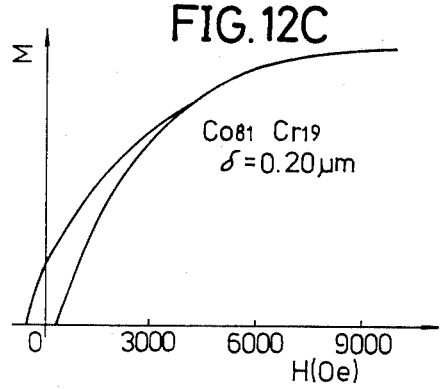
Figure 13:
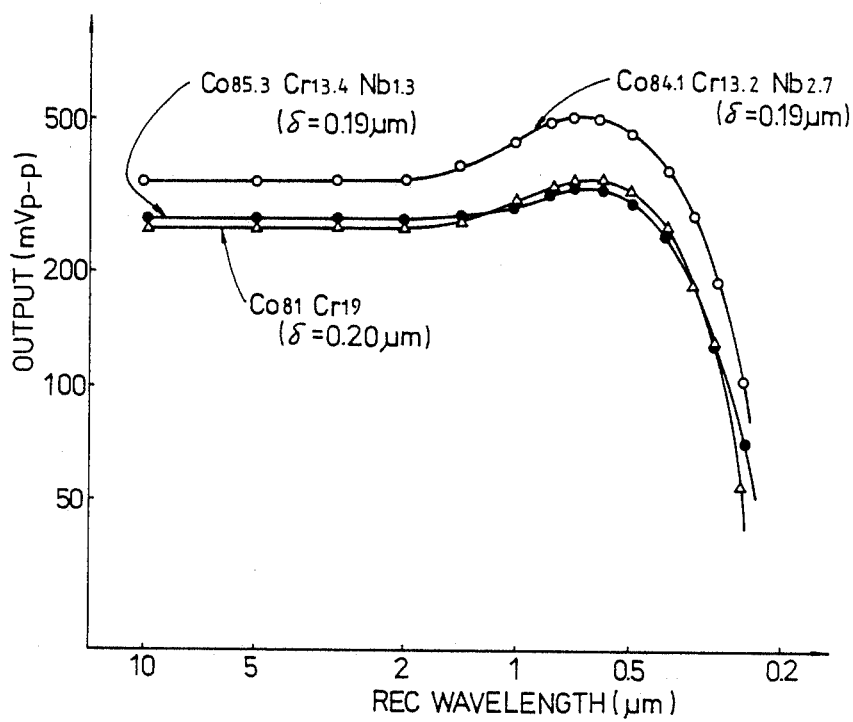
FIG. 13 is a graph showing the relationship between the recording wavelength and the reproduced output when the perpendicular magnetic recording and reproduction are performed with respect to the Co—Cr—Nb thin films and the Co—Cr thin films.
Figure 14A:
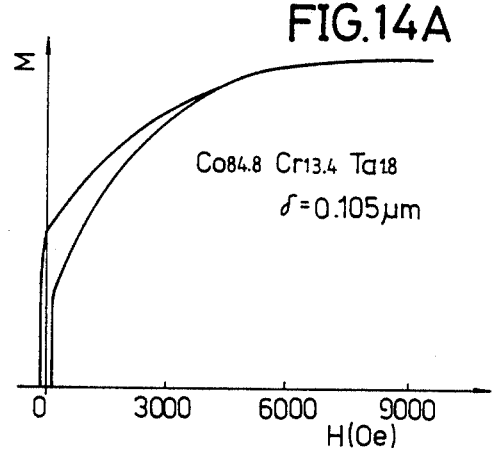
FIGS. 14A through 14C are graphs respectively showing in-plane M-H hysteresis loops of the thin films shown in Table 2.
Figure 14B:
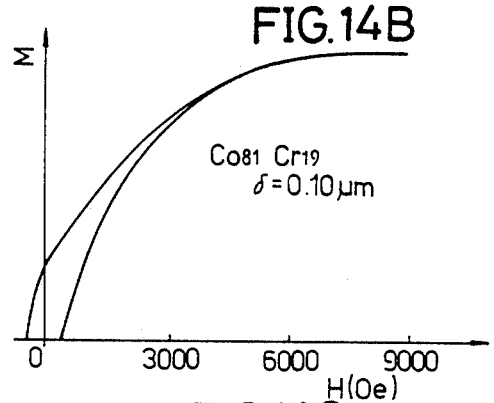
Figure 14C:
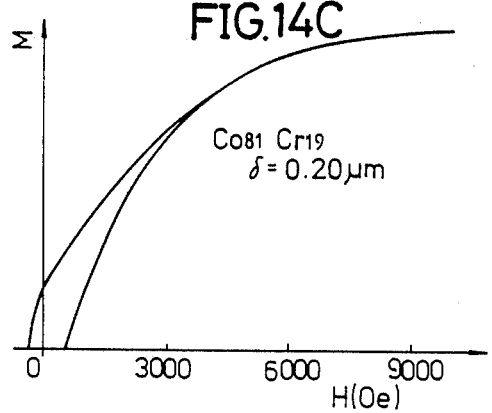

It can be seen that even in the case where the Nb is added to the Co—Cr as the third element, the coercivity Hc(⊥) which contributes to the perpendicular magnetization is large when the jump occurs as indicated by arrows C and D in FIGS. 12A and 12D, but the coercivity Hc(⊥) is small when the jump does not occur. Furthermore, when the jump occurs, the coercivity Hc(∥) of the first crystal layer is under approximately 180 Oe, the coercivity Hc(⊥) of the second crystal layer is over approximately 200 Oe, the perpendicular anisotropic magnetic field Hk is small and the in-plane squareness ratio Mr(∥)/Ms is large compared to that of the Co—Cr thin film having approximately the same film thickness. The in-plane squareness ratio Mr(∥)/Ms gradually increases from a lower limit of 0.2 as the film thickness δ decreases. In other words, the jump occurs when the in-plane squareness ratio Mr(∥)/Ms of the magnetic thin film as a whole is over 0.2. Such a characteristic was generally considered as being an unfavorable condition when the ring core head having the large magnetic flux distribution is used as the magnetic head. However, when the recording wavelength versus reproduced output characteristic of the perpendicular magnetic recording medium having the Co—Cr—Nb thin film shown in FIG. 13 is observed, it can be seen that the reproduced output obtained with the Co—Cr—Nb thin film in which the jump occurs is more satisfactory than the reproduced output obtained with the Co—Cr—Nb thin film in which no jump occurs, and the reproduced output is especially satisfactory in the region in which the recording wavelength is short. In the short wavelength region, that is, in the region in which the recording wavelength is in the range of 0.2 to 1.0 micron, the reproduced output increases for the Co—Cr thin film and also for the Co—Cr—Nb thin film in which no jump occurs. However, in the case of the Co—Cr—Nb thin film in which the jump occurs, the rate with which the reproduced output increases is larger than the rate with which the reproduced output increases in the case of the thin films having the film thicknesses described above. It can be seen that the Co—Cr—Nb thin film in which the jump occurs is especially suited for the perpendicular magnetization with the short recording wavelength. The reproduced output curve is a downwardly opening parabola in the short wavelength region, but in the case of the Co—Cr—Nb thin film in which the jump occurs, the reproduced output is larger than those obtained with the Co—Cr thin film and the Co—Cr—Nb thin film in which no jump occurs throughout the entire wavelength region.

Results similar to those obtained in the case of the Co—Cr—Nb thin film are obtained for the Co—Cr—Ta thin film. Table 2 shows various magnetic characteristics for the cases where the film thickness of the Co—Cr thin film and the Co—Cr—Ta thin film is varied. In Table 2, the same designations are used as in Table 1. FIGS. 14A through 14E are graphs respectively showing the in-plane M-H hysteresis loops of the thin films shown in Table 2. FIG. 15 shows the recording wavelength versus reproduced output characteristic of the perpendicular magnetic recording medium having the Co—Cr—Ta thin film.

TABLE 2

| Composition (at %) | δ (μm) | Ms (emu/cc) | Hc(⊥) (Oe) | Hc(//) (Oe) | Δθ50 (deg) | Mr(//)/Ms | Hk (Oe) |
| --- | --- | --- | --- | --- | --- | --- | --- |
| $Co_{84.8}Cr_{13.4}Ta_{1.8}$ | 0.105 | 406 | 770 | 114 | 11.5 | 0.46 | 750 |
| $Co_{81}Cr_{19}$ | 0.10 | 395 | 753 | 423 | 10.2 | 0.24 | 3420 |
| $Co_{81}Cr_{19}$ | 0.20 | 449 | 728 | 446 | 10.2 | 0.19 | 4350 |

As described heretofore, it can be regarded that the improvement in the reproduced output characteristic in the short wavelength region is due to the jump. The coercivity Hc(∥) of the first crystal layer in the magnetic film in which the jump occurs is smaller than the coercivity Hc(∥) of the first crystal layer in the magnetic film in which no jump occurs.

Next, description will be given with respect to the range of the coercivity ratio with which the jump occurs by referring to Table 3 and FIGS. 16 and 17, where the coercivity ratio is the ratio Hc(∥)/Hc(⊥) between the coercivity Hc(∥) of the first crystal layer and the coercivity Hc(⊥) of the second crystal layer. Table 3 shows comparison of the various magnetic characteristics of the Co—Cr—Nb thin films and the Co—Cr—Ta thin film in which the magnetization jump occurs and the various magnetic characteristics of the Co—Cr—Nb thin film and the Co—Cr thin film in which no jump occurs. In Table 3, the same designations used in Tables 1 and 2 are used. Furthermore, in Table 3, the roman numerals I through VI on the left of the table represent the six different cases and this designation is also used in FIGS. 16 and 17. The cases I through VI respectively represent the cases where the composition of the thin film is $Co_{84.8}Cr_{13.4}Ta_{1.8}$, $Co_{84.1}Cr_{13.2}Nb_{2.7}$, $Co_{83.3}Cr_{13.1}Nb_{3.6}$, $Co_{83.3}Cr_{13.1}Nb_{3.6}$, $Co_{85.3}Cr_{13.4}Nb_{1.3}$ and $Co_{81}Cr_{19}$ at%. In addition, the word "yes" under the column "Jump" indicates that the jump occurs, and the word "no" under the column "Jump" indicates that no jump occurs. The data for the cases II, V, and VI are the same as the data shown in Table 1.

TABLE 3

| Case | δ (μm) | Ms (emu/cc) | Hc(⊥) (Oe) | Hc(//) (Oe) | Δθ50 (deg) | Mr(//)/Ms | Hk (Oe) | Hc(//)/Hc(⊥) | Jump |
|---|---|---|---|---|---|---|---|---|---|
| I | 0.20 | 464 | 1275 | 231 | 8.4 | 0.23 | 4600 | 1/5.5 | yes |
| II | 0.19 | 448 | 893 | 177 | 8.7 | 0.24 | 3030 | 1/5 | yes |
| III | 0.19 | 331 | 624 | 56 | 9.2 | 0.37 | 720 | 1/11.1 | yes |
| IV | 0.19 | 334 | 759 | 36 | 6.0 | 0.26 | 450 | 1/21.1 | yes |
| V | 0.19 | 497 | 677 | 435 | 8.9 | 0.21 | 3900 | 1/1.6 | no |
| VI | 0.20 | 449 | 728 | 446 | 10.2 | 0.19 | 4350 | 1/1.6 | no |

Figure 17:
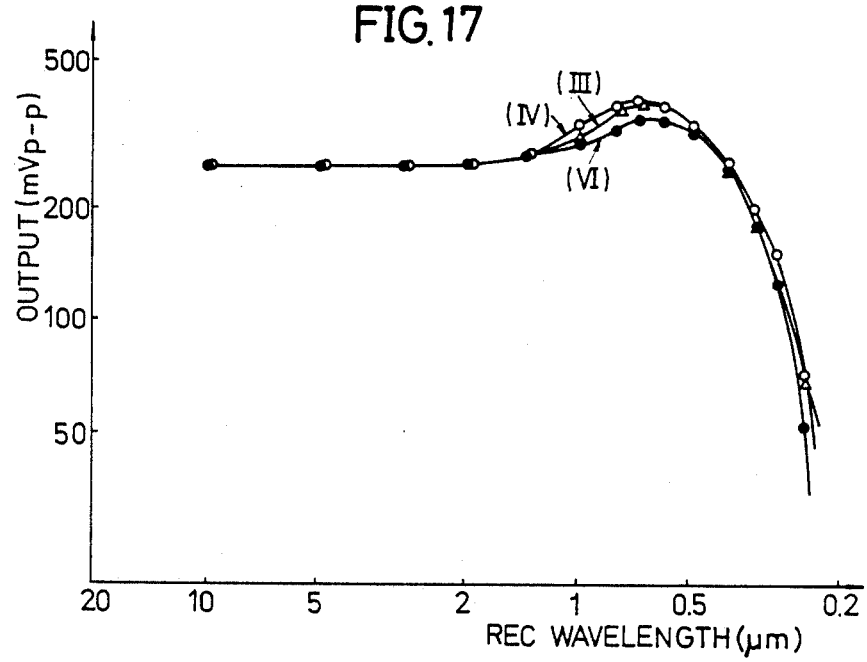

FIGS. 16 and 17 are graphs respectively showing the relationship between the recording wavelength and the reproduced output when the perpendicular magnetic recording and reproduction are performed with respect to the thin films shown in Table 3.

When the Nb or Ta is added to the Co—Cr as the third element as shown in Table 3, the coercivity Hc(⊥) which contributes to the perpendicular magnetization is large when the jump occurs, but the coercivity Hc(⊥) is small when the jump does not occur. When the recording wavelength versus reproduced output characteristics of the Co—Cr—Nb thin film and the Co—Cr—Ta thin film (hereinafter simply referred to as the Co—Cr—Nb(Ta) thin films) shown in FIGS. 16 and 17 are observed, it can be seen that the reproduced outputs obtained with the Co—Cr—Nb(Ta) thin films are more satisfactory than the reproduced outputs obtained with the Co—Cr—Nb(Ta) thin films in which no jump occurs and the Co—Cr thin film.

On the other hand, as shown in Table 3, the thin film in which the jump occurs has a coercivity ratio Hc(∥)/Hc(⊥) of under 1/5. In addition, the thin film in which no jump occurs has a large coercivity ratio Hc(∥)/Hc(⊥) in the order of 1.6. According to the experiments performed by the present inventors, it can be regarded that the upper limit of the coercivity ratio Hc(∥)/Hc(⊥) with which the jump occurs is near 1/5. Generally, it can be considered that the coercivity Hc(⊥) of the perpendicular magnetization layer suited for the perpendicular magnetic recording and reproduction is up to approximately 1500 Oe, and the coercivity Hc(∥) of the first crystal layer suited to function as the high permeability layer is in the order of 30 Oe in the average. Hence, it can be regarded that the lower limit of the coercivity ratio Hc(∥)/Hc(⊥) is near 1/50. In other words, it is possible to realize a perpendicular magnetic recording medium having a satisfactory reproduced output especially in the short wavelength region by selecting the coercivity ratio Hc(∥)/Hc(⊥) to a value greater than or equal to 1/50 and less than or equal to 1/5 when forming the magnetic layer so that the jump occurs. The value of the coercivity ratio Hc(⊥)/Hc(⊥) can be adjusted by changing the composition of the magnetic material and appropriately selecting the sputtering condition.

Figure 18:
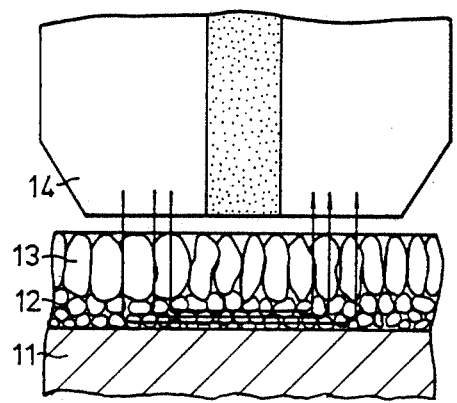
FIG. 18 is a diagram for explaining the pattern of the magnetic line of force within the perpendicular magnetic recording medium used in the perpendicular magnetic recording and reproducing system according to the present invention by the magnetic line of force from a magnetic head for the case where the thickness of the perpendicular magnetic recording medium is small.

Next, description will be given with respect to the reason why the reproduced output is improved when the jump occurs in the magnetic layer. When the magnetic layer is formed by sputtering the Co—Cr—Nb or Co—Cr—Ta, a first crystal layer 12 of fine grain having a small coercivity Hc(∥) of under approximately 180 Oe is formed in the vicinity of a base 11, and a second crystal layer 13 of course grain having a large coercivity Hc(⊥) of over approximately 200 Oe is formed on the first crystal layer 12, as shown in FIG. 18. In other words, the magnetic layer is constituted by the first and second crystal layers 12 and 13. Since the coercivity ratio Hc(∥)/Hc(⊥) between the coercivity Hc(∥) of the first crystal layer 12 and the coercivity Hc(⊥) of the second crystal layer 13 is selected to a value greater than or equal to 1/50 and less than or equal to 1/5, the jump occurs in the magnetic layer which is constituted by the first and second crystal layers 12 and 13. For this reason, it can be regarded that the magnetic flux from a ring core head 14 penetrates the second crystal layer 13, reaches the first crystal layer 12 and advances in the in-plane direction within the first crystal layer 12 having the small coercivity Hc(∥) and large permeability, and the second crystal layer 13 is magnetized in the perpendicular direction by the magnetic flux which rapidly reaches the magnetic pole portion of the ring core head 14. Hence, the pattern of the magnetic line of force from the ring core head 14 describes a generally U-shape as indicated by arrows in FIG. 18. Because the magnetic flux sharply penetrates the second crystal layer 13 at a predetermined perpendicular magnetic recording position, the second crystal layer 13 is subjected to a perpendicular magnetization which causes a large remanent magnetization.

Giving attention to the coercivity Hc(∥) of the first crystal layer 12 for the case where the jump occurs and for the case where no jump occurs, when the in-plane M-H hysteresis characteristic is such that the in-plane squareness ratio Mr(∥)/Ms is over 0.2, the coercivity Hc(∥) for the case where the jump occurs is smaller than the coercivity Hc(∥) for the case where no jump occurs. It is desirable for the first crystal layer 12 to have a high permeability in order for the first crystal layer 12 to function as the high permeability layer described before. Hence, it can be regarded that a satisfactory reproduced output is obtainable with the magnetic layer such as the Co—Cr—Nb(Ta) thin films having an in-plane M-H hysteresis characteristic in which there is a sharp rise in the vicinity of the origin and the jump occurs. According to the experiments performed by the present inventors, a satisfactory reproduced output was obtainable when the coercivity Hc(∥) of the first crystal layer 12 is under 180 Oe and the coercivity Hc(⊥) of the second crystal layer 13 is over 200 Oe, by taking into account the measuring error and the like.

Figure 19:
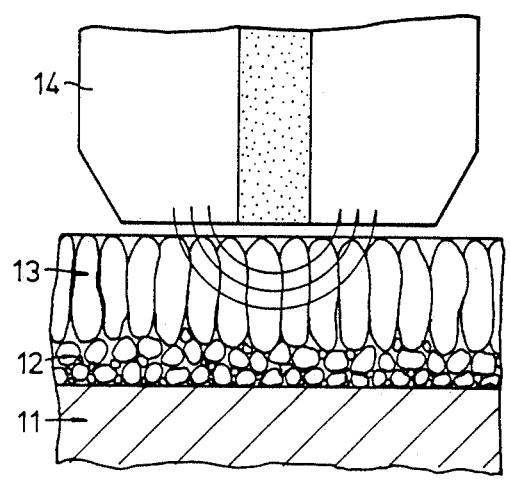
FIG. 19 is a diagram for explaining the pattern of the magnetic line of force within the perpendicular magnetic recording medium used in the perpendicular magnetic recording and reproducing system according to the present invention by the magnetic line of force from the magnetic head for the case where the thickness of the perpendicular magnetic recording medium is large.

On the other hand, giving attention to the film thickness of the Co—Cr—Nb(Ta) thin films, the thickness of the second crystal layer 12 increases when the film thickness of the thin film increases while the thickness of the first crystal layer 12 remains approximately constant. Hence, the distance between the ring core head 14 and the first crystal layer 12 increases when the film thickness of the thin film increases. For this reason, when the film thickness of the thin film is large, the magnetic line of force from the ring core head 14 does not reach the first crystal layer 12 and simply reaches the magnetic pole of the ring core head 14 by passing through the second crystal layer 13 as shown in FIG. 19. Accordingly, the magnetization direction is dispersed and it is impossible to obtain a strong perpendicular magnetization.

As described heretofore, the lower limit of the film thickness of the magnetic layer as a whole with which the jump quantity $\sigma_j$ and the coercivity Hc($\perp$) sharply rise, that is, the jump occurs, is in the range of 0.05 to 0.15 micron. On the other hand, the first crystal layer 12 has an extremely small thickness in the range of 0.05 to 0.15 micron, and the second crystal layer 13 can sufficiently function as the perpendicular magnetization layer when the thickness of the second crystal layer 13 is in the order of 0.2 micron. Therefore, the film thickness of the magnetic layer constituted by the first and second crystal layers 12 and 13 can be made extremely small, that is, under 0.3 micron.

When the film thickness of the Co—Cr—Nb(Ta) thin films is made small, the distance between the ring core head 14 and the first crystal layer 12 becomes small. As a result, the magnetic line of force from the magnetic head positively reaches the first crystal layer 12 and advances therein, and the pattern of the magnetic line of force describes the general U-shape as described before in conjunction with FIG. 18. In other words, the magnetic flux which contributes to the perpendicular magnetization is extremely sharp in the perpendicular direction, and it is possible to perform a satisfactory perpendicular magnetic recording due to the large remanent magnetization. Hence, it is possible to perform a more satisfactory perpendicular magnetic recording when the film thickness of the Co—Cr—Nb(Ta) thin films is small, and the thickness of the recording medium can therefore be made small to ensure the desired flexibility of the recording medium so as to maintain a satisfactory state of contact between the magnetic head and the recording medium. According to the experiments performed by the present inventors, it is possible to obtain a satisfactory reproduced output even when the film thickness of the thin film is in the range of 0.1 to 0.3 micron.

Figure 20:
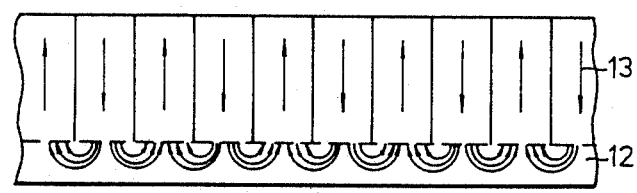
FIG. 20 is a diagram for explaining that a lower part of the remanent magnetic field formed in a second crystal layer of coarse grain is communicated through a first crystal layer of fine grain.

Since the coercivity Hc($\parallel$) of the first crystal layer 12 is not zero but is in the order of 180 Oe, it is possible to magnetize the first crystal layer 12 to an extent corresponding to this small coercivity Hc($\parallel$). When the perpendicular magnetization is performed, a plurality of magnets having reversed magnetization direction in correspondence with a predetermined bit interval are alternately formed in the second crystal layer 13 as shown in FIG. 20. On the other hand, a magnetic flux linking the lower ends of mutually adjacent magnets is formed in the first crystal layer 12 as indicated by arrows in FIG. 20. Hence, there is no demagnetization phenomenon between the mutually adjacent magnets in the second crystal layer 13, and this phenomenon is especially notable when the density between the mutually adjacent magnets is high. In other words, this phenomenon is especially notable when the recording wavelength is small, and for this reason, it is possible to considerably improve the reproduced output in the short wavelength region. In addition, the Co—Cr—Nb-(Ta) thin films respectively constituted by the high coercivity layer and the low coercivity layer are formed by a continuous sputtering process. Hence, it is unnecessary to change the sputtering condition nor change the target in order to form the two layers which constitute the thin film. As a result, the processes of forming the Co—Cr—Nb(Ta) thin films are simplified, the sputtering time can be reduced and its is possible to manufacture the perpendicular magnetic recording medium at a low cost and with a high productivity. Furthermore, because the coercivity ratio Hc($\parallel$)/Hc($\perp$) is selected to a value greater than or equal to 1/50 and less than or equal to 1/5 and the coercivity Hc($\parallel$) of the first crystal layer 12 is not considerably small compared to the coercivity Hc($\perp$) of the second crystal layer 13, the Barkhausen noise will not be generated and it is possible to perform satisfactory perpendicular magnetic recording and reproduction.

Giving attention to the ring core head 14, a ring core head made of sendust (registered trademark) which is a metal core material was used in the experiments performed to obtain the results shown in FIGS. 13 and 15. The ring core head has a simple construction and can be manufactured at a relatively low cost. Further, the ring core head simply needs to make sliding contact with only one surface of the perpendicular magnetic recording medium, and for this reason, the ring core head can be applied to various magnetic recording and reproducing apparatuses such as the video tape recorder wherein it is desirable to perform the high density recording. Sendust has a high saturation magnetic flux density of over 7000 G as is well known, and it is possible to except a satisfactory perpendicular magnetization.

Figure 21:
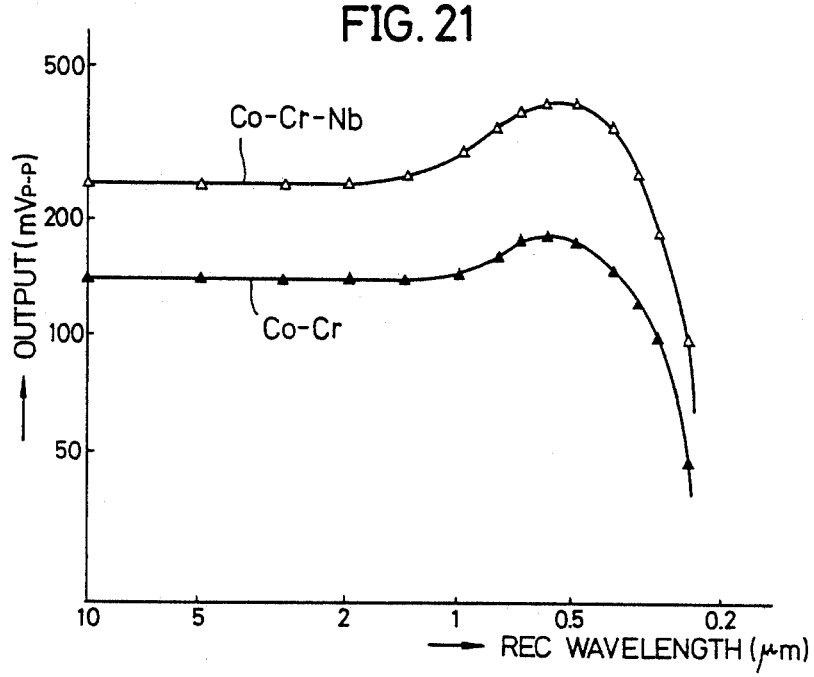
FIG. 21 is a graph showing the relationship between the recording wavelength and the reproduced output when the perpendicular magnetic recording and reproduction are performed by a sendust (registered trademark) ring core head with respect to the Co—Cr—Nb thin film in which the magnetization jump occurs and the Co—Cr thin film.
Figure 22:
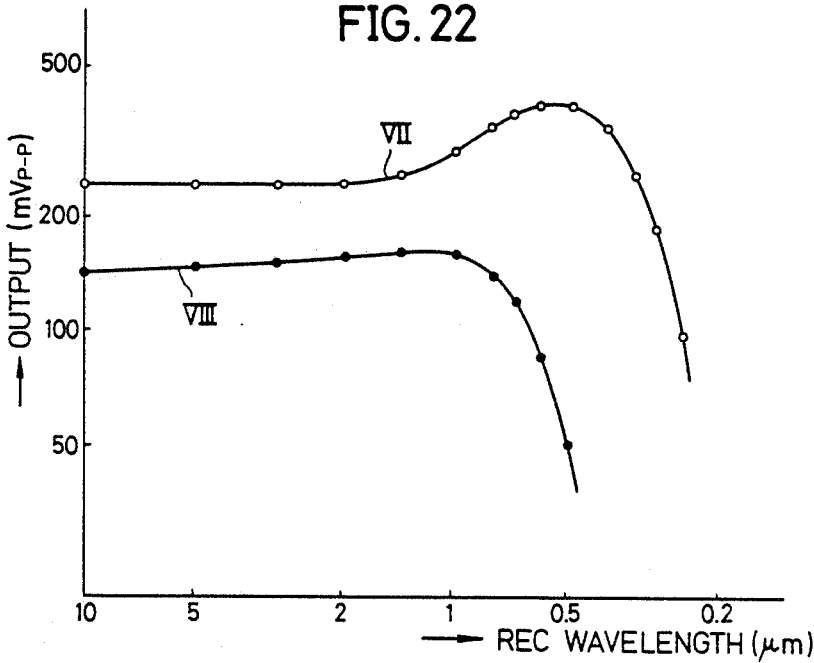
FIG. 22 is a graph showing the relationship between the recording wavelength and the reproduced output when the perpendicular magnetic recording and reproduction are performed with respect to the Co—Cr—Nb thin film in which the magnetization jump occurs by the sendust ring core head and a ferrite ring core head.
Figure 23:
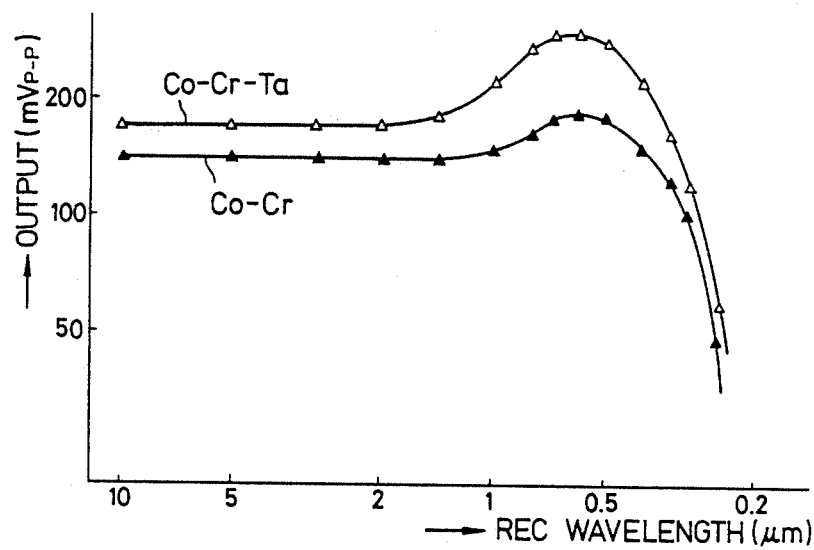
FIG. 23 is a graph showing the relationship between the recording wavelength and the reproduced output when the perpendicular magnetic recording and reproduction are performed by the sendust ring core head with respect to the Co—Cr—Ta thin film in which the magnetization jump occurs and the Co—Cr thin film.
Figure 24:
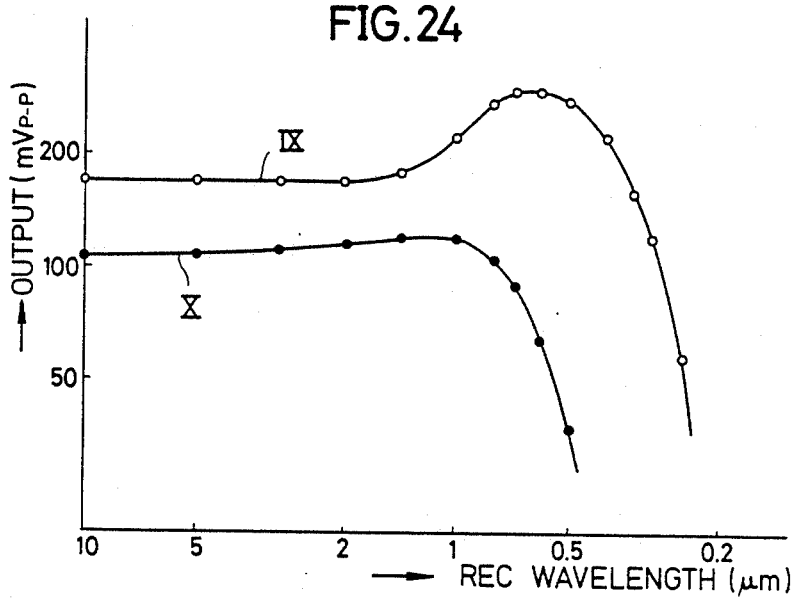
FIG. 24 is a graph showing the relationship between the recording wavelength and the reproduced output when the perpendicular magnetic recording and reproduction are performed with respect to the Co—Cr—Ta thin film in which the magnetization jump occurs by the sendust ring core head and the ferrite ring core head.

FIG. 21 is a graph showing the relationship between the recording wavelength and the reproduced output when a sendust ring core head is used as the ring core head 14 to perform the perpendicular magnetic recording and reproduction with respect to the Co—Cr—Nb thin film in which the jump occurs and the Co—Cr thin film. FIG. 22 is a graph showing the relationship between the recording wavelength and the reproduced output when the sendust ring core head and a ferrite ring core head are used as the ring core head 14 to perform the perpendicular magnetic recording and reproduction with respect to the Co—Cr—Nb thin film in which the jump occurs. In FIG. 22, the reproduced output obtained with the sendust ring core head is indicated by a curve VII, and the reproduced output obtained with the ferrite ring core head is indicated by a curve VIII. FIG. 23 is a graph showing the relationship between the recording wavelength and the reproduced output when the sendust ring core head is used as the ring core head 14 to perform the perpendicular magnetic recording and reproduction with respect to the Co—Cr—Ta thin film in which the jump occurs and the Co—Cr thin film. FIG. 24 is a graph showing the relationship between the recording wavelength and the reproduced output when the sendust ring core head and the ferrite ring core head are used as the ring core head 14 to perform the perpendicular magnetic recording and reproduction with respect to the Co—Cr—Ta thin film in which the jump occurs. In FIG. 24, the reproduced output obtained with the sendust ring core head is indicated by a curve IX, and the reproduced output obtained with the ferrite ring core head is indicated by a curve X.

From FIGS. 21 through 24, it can be seen that the reproduced output is large throughout the entire wavelength region when the recording and reproduction are performed with the combination of the sendust ring core head and the Co—Cr—Nb(Ta) thin films in which the jump occurs compared to the case where the recording and reproduction are performed with other combinations. This phenomenon is especially notable in the short wavelength region of 1 to 0.2 micron. As shown in Tables 1 and 2, although the magnetic characteristics (saturation magnetization Ms and the perpendicular coercivity Hc($\perp$)) of the Co—Cr thin film and the Co—Cr—Nb(Ta) thin films are not much different, there is a big difference in the reproduced outputs. As described before, the Co—Cr—Nb(Ta) thin films in which the jump occurs respectively have a two-layer constitution comprising the first crystal layer 12 having the low coercivity and the second crystal layer 13 having the high perpendicular coercivity. It can be regarded that the big difference in the reproduced outputs is introduced because the first crystal layer 12 increases the perpendicular component in the magnetic flux of the sendust ring core head and also decreases the demagnetization field within the second crystal layer 13.

Giving attention to the material of the ring core head 14, it is seen from FIGS. 22 and 24 that there is no improvement in the reproduced output even in the short wavelength region when the ferrite ring core head is used as the ring core head 14. The deterioration in the reproduced output in the short wavelength region is notable compared to the case where the sendust ring core head is used as the ring core head 14. The saturation magnetic flux density of ferrite is low compared to that of sendust, and it can thus be conjectured that the deterioration in the reproduced output is caused since the magnetic line of force from the ferrite ring core head does not reach the first crystal layer 12.

It can be regarded that the combination of the Co—Cr—Tb(Ta) thin films and the sendust ring core head having the high saturation magnetic flux density is effective in obtaining a satisfactory reproduced output when the first crystal layer 12 functions as a layer having low coercivity Hc($\parallel$), that is, when the magnetic field of the sendust ring core head sufficiently reaches the first crystal layer 12. Accordingly, the reproduced output becomes large when the film thickness of the Co—Cr—Nb(Ta) thin films is small with respect to the gap width of the sendust ring core head and when the saturation magnetix flux density of the ring core head is sufficiently large. For these reasons, the use of the perpendicular magnetic recording medium comprising the Co—Cr—Nb(Ta) thin films in which the jump occurs and the use of the sendust ring core head having the high saturation magnetic flux density are not only extremely effective in realizing satisfactory perpendicular magnetic recording and reproduction, but are also effective from the point of view of making the thickness of the perpendicular magnetic recording medium small so that the reproduced output is improved due to the satisfactory state of contact between the head and the perpendicular magnetic recording medium. In the embodiment, sendust is used as the material constituting the ring core head 14, but other metal core materials such as permalloy and amorphous alloy may be used. It is also possible to use as the ring core head 14 a composite ring core head constituted by the metal core materials.

Next, description will be given with respect to combinations of magnetic heads having various construction and perpendicular magnetic recording mediums having various construction. Generally, it is known that (i) a ring core head, (ii) a thin film ring core head, (iii) a single-sided main pole type head and (iv) an auxiliary pole type head can be used as the magnetic head for performing the perpendicular magnetic recording and reproduction. On the other hand, the perpendicular magnetic recording medium can be (a) the recording medium used in the present invention comprising the first crystal layer of fine grain and the second crystal layer of coarse grain which are made of the same magnetic material and constitute the magnetic layer of the recording medium, (b) the conventional recording medium comprising the single layer of Co—Cr alloy as the magnetic layer of the recording medium and (c) the conventional recording medium having the double film construction and comprising a high permeability layer of Ni—Fe and the like and a perpendicular magnetization layer of Co—Cr and the like on top of the Ni—Fe layer. In FIGS. 25A through 28C which will be described hereinafter, the magnetic flux from the magnetic head is indicated by arrows, and description will be given with respect to the magnetic recording and reproducing characteristics for each combination of the magnetic head and the perpendicular magnetic recording medium. In FIGS. 25A through 28C, a ring core head 21, a thin film ring core head 22, a single-sided main pole type head 23 or an auxiliary pole type head 24 is used as the magnetic head, and gaps 21a, 22a and 23a of the magnetic heads are respectively indicated by aventurines. A recording medium 25 is of the type (a) described above and comprises a first crystal layer 25a of fine grain and a second crystal layer 25b of coarse grain. A recording medium 26 is of the type (b) described above. A recording medium 27 is of the type (c) described above and comprises a high permeability layer 27a and a perpendicular magnetization layer 27b. In FIGS. 25A through 28C, the illustration of the base of the recording medium is omitted.

First, description will be given with respect to the combination of the ring core head 21 and each of the recording mediums 25 through 27.

(A1) In the case of the combination of the ring core head 21 and the recording medium 25 as shown in FIG. 25A, the first crystal layer 25a functions as the high permeability layer as described before and the perpendicular component in the magnetic field of the ring core head 21 increases. Furthermore, because the thickness of the first crystal layer 25a is small and the coercivity Hc of the first crystal layer 25a is relatively large compared to that of the high permeability layer 27a of the recording medium 27, the region which contributes to the perpendicular magnetization is restricted and it is possible to obtain a narrow recording region as will be described later. Accordingly, the recording sensitivity is satisfactory, and the recording and reproducing characteristics are both satisfactory. In addition, the reproducing characteristic is more satisfactory compared to the heads 22 through 24 having other construction.

(B1) In the case of the combination of the ring core head 21 and the recording medium 26 as shown in FIG. 25B, the magnetic field of the ring core head 21 includes considerable in-plane components. For this reason, the recording medium 26 must have an excellent perpendicular orientation and the perpendicular anisotropic magnetic field Hk must be large. In this case, the reproducing sensitivity is satisfactory, however, the recording medium 26 must satisfy the above strict conditions in order to realize a satisfactory perpendicular magnetic recording.

(C1) In the case of the combination of the ring core head 21 and the recording medium 27 as shown in FIG. 25C, the perpendicular component in the magnetic field of the ring core head 21 increases due to the existence of the high permeability layer 27a. However, since the coercivity Hc of the high permeability layer 27a is under several Oe and small and the thickness of the high permeability layer 27a is large, the region which contributes to the perpendicular magnetization is large and the demagnetization at the time of the recording is large. Hence, the recording sensitivity is poor.

Next, description will be given with respect to the combination of the thin film ring core head 22 and each of the recording mediums 25 through 27.

(A2) In the case of the combination of the thin film ring core head 22 and the recording medium 25 as shown in FIG. 26A, results similar to those obtained in the case (A1) described before are obtained at the time of the recording and it is possible to obtain a satisfactory recording characteristic. However, the length L of the pole of the thin film ring core head 22 is small compared to that of the ring core head 21, and for this reason, a dip peculiar to the thin film ring core head 22 is introduced in the reproduced waveform characteristic. Therefore, there is a problem in that the reproducing sensitivity is unsatisfactory.

(B2) In the case of the combination of the thin film ring core head 22 and the recording medium 26 as shown in FIG. 26B, results similar to those obtained in the case (B1) described before are obtained at the time of the recording and the recording characteristic is unsatisfactory. On the other hand, the problem of unsatisfactory reproducieng sensitivity occurs as in the case (B1) described above because the length L of the pole of the thin film ring core head 22 is small.

(C2) In the case of the combination of the thin film ring core head 22 and the recording medium 27 as shown in FIG. 26C, the perpendicular component in the magnetic field of the thin film ring core head 22 increases due to the existence of the high permeability layer 27a. In addition, the region which contributes to the perpendicular magnetization is restricted and it is possible to obtain a narrow recording region since the length L of the pole of the thin film ring core head 22 is small. As a result, it is possible to perform a satisfactory perpendicular magnetic recording. However, the dip is introduced in the reproduced waveform characteristic as in the case (A2) described above and the reproducing sensitivity is unsatisfactory.

Next, description will be given with respect to the combination of the single-sided main pole type head 23 and each of the recording mediums 25 through 27.

(A3) In the case of the combination of the single-sided main pole type head 23 and the recording medium 25 as shown in FIG. 27A, the first crystal layer 25a does not sufficiently function as the high permeability layer with respect to the single-sided main pole type head 23 because the thickness of the first crystal layer 25a is small and the coercivities Hc/($\parallel$) and Hc($\perp$) of the first crystal layer 25a are relatively large compared to those of the high permeability layer 27a of the recording medium 27. Hence, it is considered impossible to perform the perpendicular magnetic recording and reproduction in this case.

(B3) In the case of the combination of the single-sided main pole type head 23 and the recording medium 26 as shown in FIG. 27B, the magnetic flux is not concentrated at the tip end of a main magnetic pole 23b of the single-sided main pole type head 23 since no high permeability layer exists. Thus, it is virtually impossible to perform the perpendicular magnetic recording and reproduction.

(C3) In the case of the combination of the single-sided main pole type head 23 and the recording medium 27 as shown in FIG. 27C, the magnetic flux is concentrated at the tip end of the main magnetic pole 23b of the single-sided main pole type head 23 due to the provision of the high permeability layer 27a. The recording and reproducing sensitivities are thus satisfactory to a certain extent but are poor compared to those of the case (A1) described before.

Next, description will be given with respect to the combination of the auxiliary pole type head 24 and each of the recording mediums 25 through 27.

(A4) In the case of the combination of the auxiliary pole type head 24 and the recording medium 25 as shown in FIG. 28A, a main magnetic pole 24a of the auxiliary pole type head 24 opposes an auxiliary magnetic pole 24b of the auxiliary pole type head 24 with the recording medium 25 interposed between the main and auxiliary magnetic poles 24a and 24b. Hence, there is a fundamental problem in that a large current is required to generate a magnetic flux sufficient to perform the perpendicular magnetization. In addition, it is impossible to sufficiently excite the auxiliary pole type head 24 by the recorded remanent magnetic field of the recording medium 25 at the time of the reproduction, and there is a problem in that the reproducing sensitivity is poor. Therefore, it is possible to perform the perpendicular magnetic recording in this case, but the reproducing sensitivity is poor.

(B4) In the case of the combination of the auxiliary pole type head 24 and the recording medium 26 as shown in FIG. 28B, it is possible to perform the perpendicular magnetic recording but the reproducing sensitivity is poor for the reasons described for the case (A4) above.

(C4) In the case of the combination of the auxiliary pole type head 24 and the recording medium 27 as shown in FIG. 28C, the magnetic flux is concentrated at the tip end of the main magnetic pole 24a due to the existence of the high permeability layer 27a of the recording medium 27 and it is possible to perform a satisfactory perpendicular magnetic recording. However, for the reasons described before for the cases (A4) and (B4), the reproducing sensitivity is poor.

As is clear from the description given heretofore, the combination employed in the perpendicular magnetic recording and reproducing system of the present invention, that is, the combination of the ring core 21 and the recording medium 25, realizes the most satisfactory perpendicular magnetic recording and reproduction out of the various combinations of the magnetic heads and the recording medium. It can be regarded that the most satisfactory result is obtained in the perpendicular magnetic recording and reproducing system of the present invention because the demagnetization of the recording is effectively suppressed. Description will now be given with respect to the relationship between the perpendicular magnetic recording and reproducing characteristics and the demagnetization of the recording in the perpendicular magnetic recording and reproducing system of the present invention, in comparison with perpendicular magnetic recording and reproducing systems using other combinations. The deterioration in the perpendicular magnetic recording and reproducing characteristics in FIGS. 26A through 28C is mainly due to the construction of the magnetic head. Hence, description will only be given with respect to each of the combinations shown in FIGS. 25A through 25C wherein the ring core head 21 is used.

Figure 29:
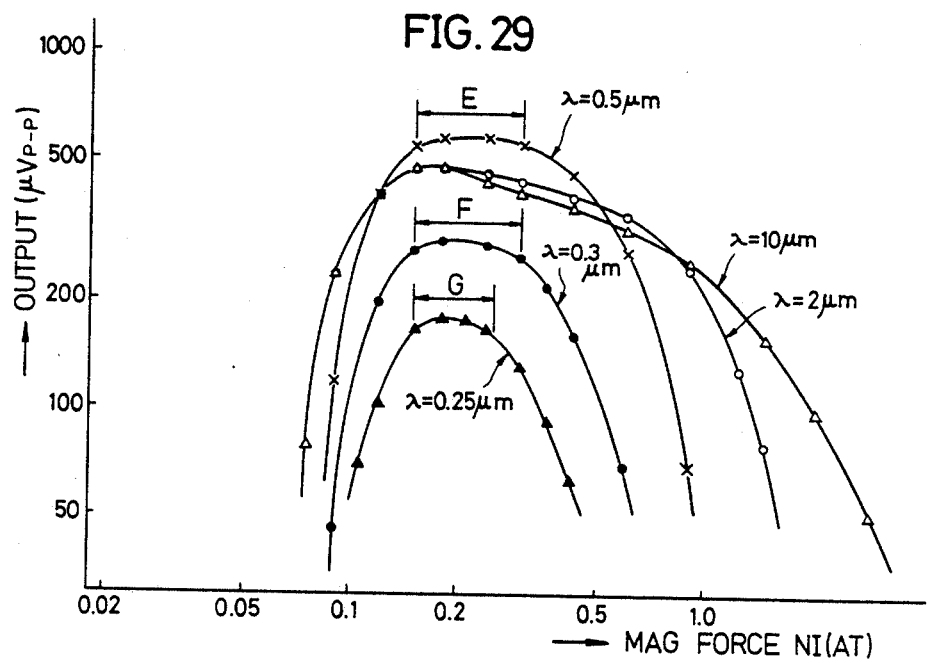
FIG. 29 is a graph showing the relationship between the magnetomotive force and the reproduced output for respective recording wavelengths in the perpendicular magnetic recording and reproducing system of the present invention.

FIG. 29 is a graph showing the relationship between the magnetomotive force NI and the reproduced output for respective recording wavelengths λ in the perpendicular magnetic recording and reproducing system of the present invention which uses the combination of the ring core head 21 and the recording medium 25 shown in FIG. 25A. The results shown in FIG. 29 were obtained by use of a ring core head which is made of sendust as the recording head and the reproducing head. The gap length of the ring core head 21 is 0.22 micron, and the relative speed between the ring core head 21 and the recording medium 25 is 2.07 m/sec. The recording wavelength is selected to 10, 2, 0.5, 0.3 and 0.25 microns. As may be seen from FIG. 29, in the case where the recording wavelength is 10 or 2 microns, the reproduced output gradually decreases when the magnetomotive force NI is over 0.18 AT. This is because the recording wavelength is large and the first crystal layer 25a does not sufficiently function as the high permeability layer, thereby causing the demagnetization of the the recording. On the other hand, in the case where the recording wavelength is under 0.5 micron and is in the short wavelength region, the reproduced output is approximately flat in regions indicated by E through G. The regions E through G correspond to the regions in which the reproduced output increases in FIGS. 13 and 15 through 17. Hence, it is seen that the first crystal layer 25a effectively functions as the high permeability layer in the short wavelength region and the demagnetization of the recording is extremely small.

The magnitude of the magnetomotive force NI in FIG. 29 should be noted. It is known that when the ring core head is used to perform the perpendicular magnetic recording, a large magnetomotive force is generally required to perform the recording with the short recording wavelength. However, in FIG. 29, a saturation magnetomotive force $NI_{max}$ for each of the recording wavelengths is 0.15 to 0.18 AT which is extremely small and virtually does not change. This means that the perpendicular magnetic recording can be performed with a small magnetomotive force NI regardless of the recording wavelength. Therefore, it is possible to realize a stable perpendicular magnetization and reduce the power consumption of the ring core head 21.

The above characteristics are advantageous from the point of view of improving the re-writing (or over-writing) characteristic of the digital recording, for example. As is well known, when the recording is first made on the recording medium with the short recording wavelength and a recording is thereafter made on this recording medium with the long recording wavelength in the conventional perpendicular magnetic recording and reproducing system, there is a problem in that the recording made with the short wavelength is not easily erased. However, according to the perpendicular magnetic recording and reproducing system of the present invention, such a problem will not occur because the saturation magnetomotive force NI is approximately constant regardless of the recording wavelength, and it is thus possible to improve the re-writing characteristic.

Figure 30:
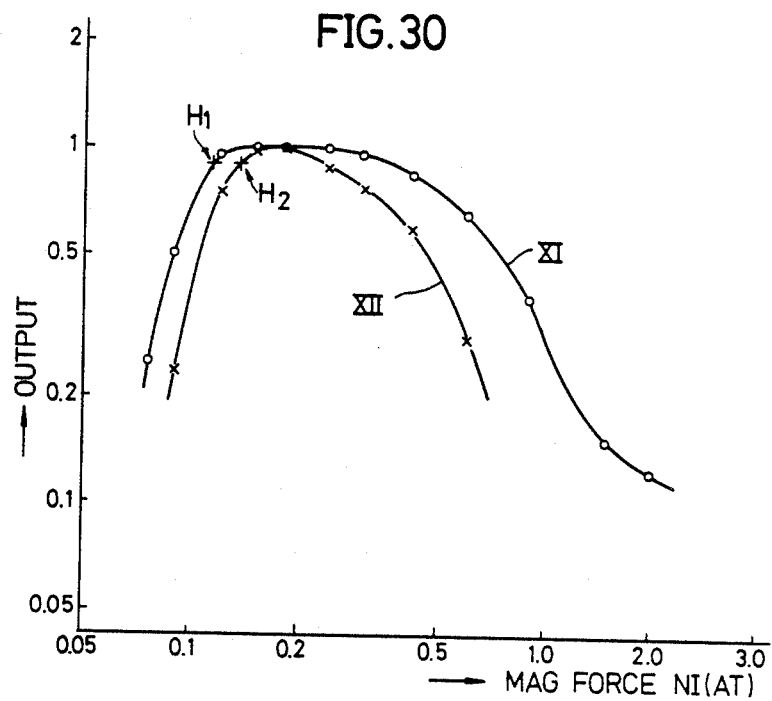
FIG. 30 is a graph showing the relationship between the magnetomotive force and the reproduced output for respective recording wavelengths in the perpendicular magnetic recording and reproducing system of the present invention in comparison with that of a conceivable perpendicular magnetic recording and reproducing system.

FIG. 30 is a graph showing the relationship between the magnetomotive force and the reproduced output for respective recording wavelengths in the perpendicular magnetic recording and reproducing system of the present invention in comparison with that of the conceivable perpendicular magnetic recording and reproducing system using the combination of the ring core head 21 and the recording medium 26 shown in FIG. 25B. The results shown in FIG. 30 were obtained by use of a ring core head which is made of sendust as the recording head and the reproducing head. The gap length of the ring core head 21 is 0.22 micron, and the relative speed between the ring core head 21 and the recording medium 26 is 2.07 m/sec. The recording wavelength is selected to 0.5 micron. In addition, a recording medium comprising the Co—Cr—Nb thin film is used as the recording medium 25, and a recording medium comprising the Co—Cr thin film is used as the recording medium 26. In FIG. 30, the ordinate indicates the relative logarithmic value of the reproduced output by taking the saturation output as one. Further, the reproduced output obtained with the recording medium 25 is indicated by a curve XI, and the reproduced output obtained with the recording medium 26 is indicated by a curve XII. The magnetic characteristics of these recording mediums 25 and 26 are shown in the following Table 4.

TABLE 4

| Composition (at %) | δ (μm) | Ms (emu/cc) | Hc(⊥) (Oe) | Hc(//) (Oe) | Δθ50 (deg) | Mr(//)/Ms | Hk (Oe) |
|---|---|---|---|---|---|---|---|
| Co—Cr—Nb | 0.18 | 360 | 750 | 114 | 9.7 | 0.21 | 3690 |
| Co—Cr | 0.20 | 449 | 728 | 446 | 10.1 | 0.19 | 4350 |

As may be seen from Table 4, the coercivities Hc(⊥) of the recording mediums 25 and 26 are selected to approximately the same values.

It may be seen from FIG. 30 that the recording medium 25 has such a characteristic that the saturation output is maintained for a wide range of the magnetomotive force NI. On the other hand, compared to the recording medium 25, the recording medium 26 has such a characteristic that the saturation output is only reached for an extremely narrow range of the magnetomotive force NI. In addition, when the magnetomotive force NI is increased from the value with which the saturation output is obtained, the decrease in the reproduced output is small in the system of the present invention which uses the combination shown in FIG. 25A compared to the decrease in the reproduced output in the conceivable system which uses the combination shown in FIG. 25B. Hence, it can be seen from FIG. 30 that it is possible to perform a more satisfactory perpendicular magnetic recording and reproduction in the system of the present invention which uses the combination shown in FIG. 25A compared to the conceivable system which uses the combination shown in FIG. 25B. When the value of the magnetomotive force NI with which it is possible to obtain a reproduced output which is 90% of the saturation output is designated by NI(90), the system of the present invention which uses the combination shown in FIG. 25A has an NI(90) H1 which is smaller than an NI(90) H2 of the conceivable system which uses the combination shown in FIG. 25B, as shown in FIG. 30.

The characteristics of the combination used in the system of the present invention are obtained because the first crystal layer 25a of the recording medium 25 functions as the high permeability layer and increases the perpendicular components in the magnetic flux of the ring core head 21 which has the high magnetic flux density. Furthermore, such characteristics are obtained since the demagnetization field is decreased in the second crystal layer 25b of the recording medium 25.

Figure 31A:
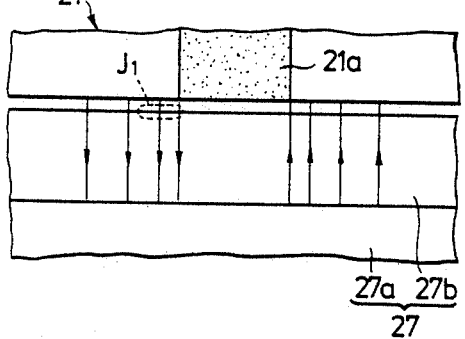
FIGS. 31A through 31C are diagrams for explaining the change in the region which contributes to the perpendicular magnetization when the magnetomotive force of the ring core head is successively increased in the conceivable perpendicular magnetic recording and reproducing system.
Figure 32A:
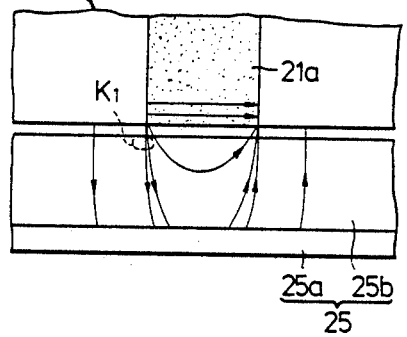
FIGS. 32A through 32C are diagrams for explaining the change in the region which contributes to the perpendicular magnetization when the magnetomotive force of the ring core head is successively increased in the perpendicular magnetic recording and reproducing system of the present invention.
Figure 31B:
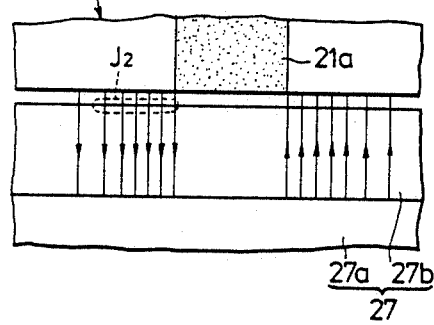
Figure 32B:
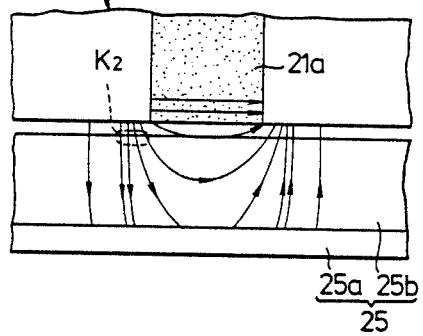
Figure 31C:
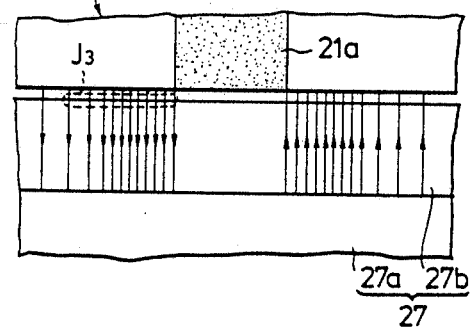
Figure 32C:
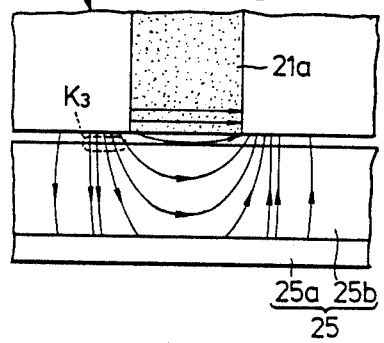

It is proven from FIGS. 29 and 30 that the perpendicular magnetic recording and reproducing characteristics are improved in the system of the present invention due to the suppression of the demagnetization of the recording. The reason why the demagnetization of the recording is suppressed in the system of the present invention will now be described by comparing the system of the present invention with the conceivable system which uses the combination shown in FIG. 25C. FIGS. 31A through 31C are diagrams for explaining the change in the region which contributes to the perpendicular magnetization when the magnetomotive force NI of the ring core head 21 is successively increased in the conceivable system which uses the combination shown in FIG. 25C. FIGS. 32A through 32C are diagrams for explaining the change in the routine which contributes to the perpendicular magnetization when the magnetomotive force NI of the ring core head 21 is successively increased in the system of the present invention which uses the combination shown in FIG. 25A.

In the case of an ideal recording medium 27 in which the thickness of the high permeability layer 27a is sufficiently large and the coercivity Hc of the high permeability layer 27a is extremely small, it is possible to intensify the perpendicular component in the magnetic field of the ring core head 21. However, as shown in FIGS. 31A through 31C, regions J1 through J3 which contribute to the perpendicular magnetization become large as the magnetomotive force NI becomes large. This is due to the extremely small coercivity Hc of the high permeability layer 27a. As is well known, the demagnetization of the recording is caused by the spreading of the magnetic field distribution, and thus, the demagnetization of the recording becomes large when the region contributing to the perpendicular magnetization spreads and becomes large. As a result of the spreading of the region which contributes to the perpendicular magnetization, the reproduced output decreases and the range of the magnetomotive force NI in which the saturation output can be maintained becomes narrow.

However, in the system of the present invention, the first crystal layer 25a of the recording medium 25 is magnetically saturated with ease because the thickness of the first crystal layer 25a is small and the coercivity Hc of the first crystal layer 25a is relatively large compared to that of the high permeability layer 27a. Hence, as the magnetomotive force NI increases, the first crystal layer 25a becomes saturated from a vicinity of the gap 21a, and the in-plane component in the magnetic field of the ring core head 21 increases. In the region which is slightly separated from the gap 21a which finally determines the magnetization direction of the recording medium 25, the first crystal layer 25a is not saturated and the first crystal layer 25a functions as the high permeability layer to intensity the perpendicular component in the magnetic field of the ring core head 21. This means that regions K1 through K3 which contribute to the perpendicular magnetization do not become large so much even when the magnetomotive force NI becomes large.

Explaining the above in more detail, in the case where the magnetomotive force NI is small in FIG. 32A, the first crystal layer 25a does not become magnetically saturated, and the first crystal layer 25a functions as the high permeability layer in the narrow region in the vicinity of the edge of the gap 21a. For this reason, the perpendicular component in the magnetic field of the ring core head 21 is intensified in this narrow region, and a perpendicular magnetic recording is performed in which the spreading of the magnetic flux is small, that is, the demagnetization of the recording is small. In addition, as the magnetomotive force NI is successively increased as shown in FIGS. 32B and 32C, the first crystal layer 25a is saturated in the vicinity of the gap 21a, and the first crystal layer 25a does not function sufficiently as the high permeability layer. As a result, the in-plane component in the magnetic field of the ring core head 21 increases in this saturated region. However, the first crystal layer 25a is still not saturated in the region slightly separated from the gap 21a and in this region the first crystal layer 25a sufficiently functions as the high permeability layer. In other words, the regions K1 through K3 contributing to the perpendicular magnetization move slightly in a direction separating from the gap 21a as the magnetomotive force NI becomes large. Therefore, although the region contributing to the perpendicular magnetization slightly increases in size as the magnetomotive force NI becomes large, the increase is extremely small that the region contributing to the perpendicular magnetization may be considered approximately constant regardless of the increase in the magnetomotive force NI, and it is hence possible decrease the demagnetization of the recording.

As described heretofore, the recording medium comprising the magnetic layer which is constituted by the first and second crystal layers which are made of the same magnetic material is used in the system of the present invention, and the magnetic recording medium functions most effectively in combination with the ring core head. Since the system of the present invention uses this combination of the recording medium and the ring core head, it is possible to improve the reproducing characteristic, suppress the demagnetization of the recording and realize perpendicular magnetic recording and reproduction in which the magnetomotive force NI can be made small.

Further, the present invention is not limited to these embodiments, but various variations and modifications may be made without departing from the scope of the present invention.

We claim:

1. A perpendicular magnetic recording and reproducing system for recording and reproducing a signal on and from a perpendicular magnetic recording medium by use of a ring core head, said perpendicular magnetic recording medium comprising a medium base, a magnetic layer formed on said medium base, said magnetic layer being made of a single magnetic material and formed by a single continuous sputtering process, said single magnetic material being constituted by cobalt, chromium and at least one of tantalum and niobium, said magnetic layer comprising an upper layer portion having a coercivity larger than approximately 900 Oe in a direction perpendicular to a surface of said magnetic layer, and a lower layer portion having coercivities less than approximately 180 Oe in both of an in-plane direction of said magnetic layer and said direction perpendicular to said surface of said magnetic layer, wherein said upper and lower layer portions of said single magnetic layer are formed as a consequence of said single continuous sputtering of said single magnetic material upon said medium base.

2. A recording and reproducing system as claimed in claim 1 in which a metal is used to form said ring core head.

3. A recording and reproducing system as claimed in claim 2 in which the metal used for said ring core head is selected from amorphous alloy, sendust and permalloy.

4. A recording and reproducing system as claimed in claim 2 in which said metal used for said ring core head has a saturation magnetic flux density of over 7000 G.

* * * * *